(12) United States Patent
Ono et al.

(10) Patent No.: US 6,327,930 B1
(45) Date of Patent: Dec. 11, 2001

(54) PEDAL DISPLACEMENT-CONTROL STRUCTURE FOR A VEHICLE

(75) Inventors: Masahiro Ono, Okazaki; Kazuhiko Kato, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 174 days.

(21) Appl. No.: 08/987,236

(22) Filed: Dec. 9, 1997

(30) Foreign Application Priority Data

Dec. 11, 1996 (JP) .................................................. 8-331052
Feb. 20, 1997 (JP) .................................................. 9-036692
Mar. 10, 1997 (JP) .................................................. 9-055291

(51) Int. Cl.$^7$ ........................................................ G05G 1/14
(52) U.S. Cl. ......................... 74/512; 296/189; 280/750; 188/377
(58) Field of Search ..................... 74/512, 560; 188/377; 280/750, 752, 784; 296/189

(56) References Cited

U.S. PATENT DOCUMENTS 5,685,200 * 11/1997 Baumann ............................... 74/512
5,778,732 * 7/1998 Patzelt et al. .......................... 74/512

FOREIGN PATENT DOCUMENTS

| 3-904616 | 8/1989 | (DE) . |
| 4-409235 | 10/1994 | (DE) . |
| 4-409285 | 10/1994 | (DE) . |
| 4-409324 | 10/1994 | (DE) . |
| 19515852-A1 | 11/1995 | (DE) . |
| 19601800-A1 | 8/1996 | (DE) . |
| 0659615-A1 | 12/1994 | (EP) . |
| 1-73464 | 5/1989 | (JP) . |
| WO 96/22903 | 8/1996 | (WO) . |

* cited by examiner

Primary Examiner—David A. Bucci
Assistant Examiner—Chong H. Kim
(74) Attorney, Agent, or Firm—Oliff & Berridge, PLC

(57) ABSTRACT

A pedal displacement control structure for a vehicle comprising: a pedal bracket fixed to a first member of a vehicle body which is displaced to rearward of the vehicle when an external force larger than a predetermined value is exerted to the front portion of the vehicle; a suspension-type vehicle pedal having a rotation shaft which becomes a center of pivot is supported by the pedal bracket; a displacement control device for controlling the displacement of a tread of the vehicle pedal by putting a pushing force frontward of the vehicle around the rotation shaft on the vehicle pedal when the vehicle pedal is displaced to rearward of the vehicle with the displacement of the first member of the vehicle body to rearward of the vehicle, which is provided in a second member on the vehicle body having high intensity and arranged more rearward of the vehicle than the vehicle pedal; and a device for inhibiting the push-reaction force larger than a predetermined value from being transmitted to the second member on the vehicle body via the displacement control device, when the pushing force is put on the vehicle pedal from the displacement control device. Hence, the displacement of the tread of the vehicle pedal is controlled.

18 Claims, 19 Drawing Sheets

F I G. 3
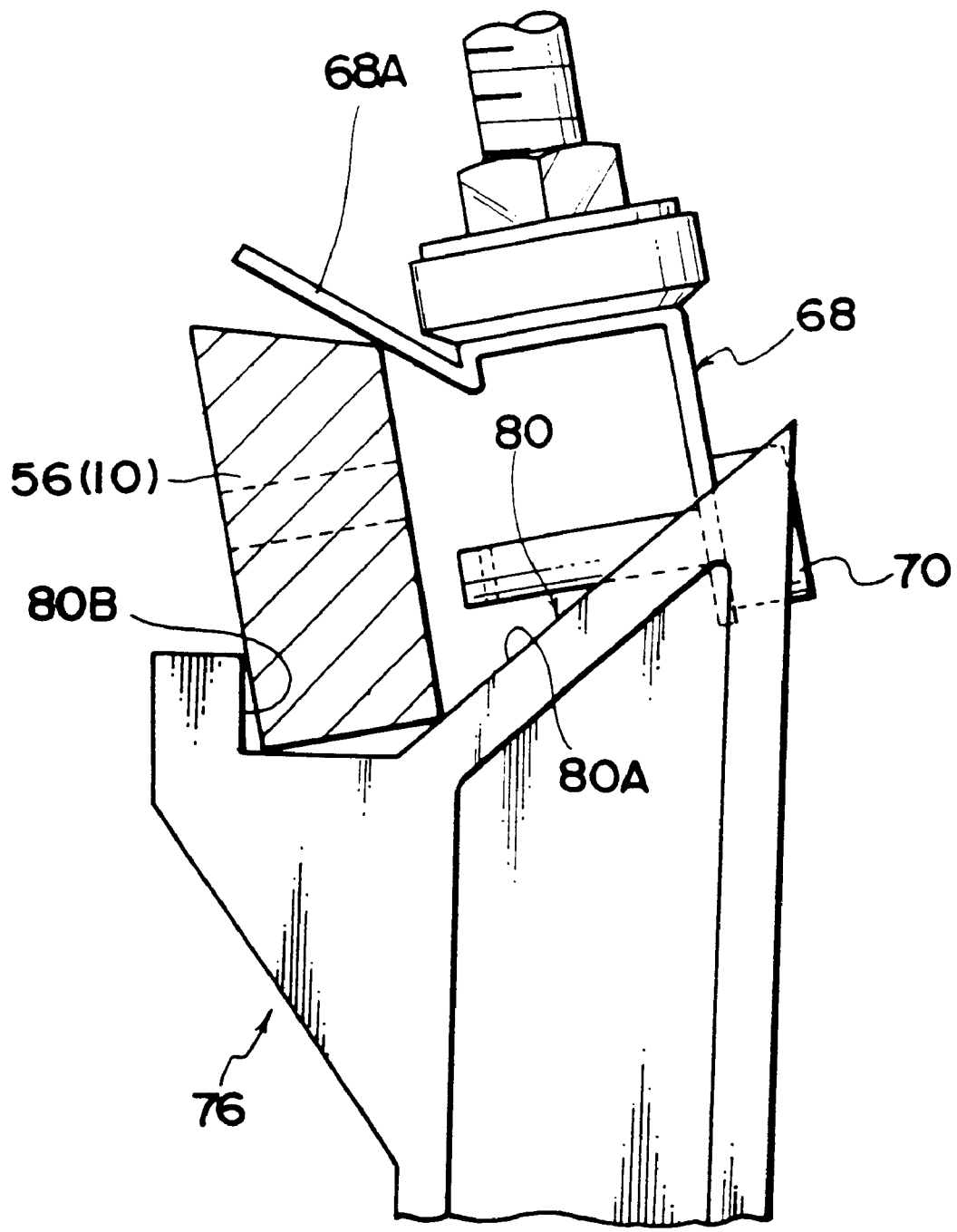

F I G. 1 5
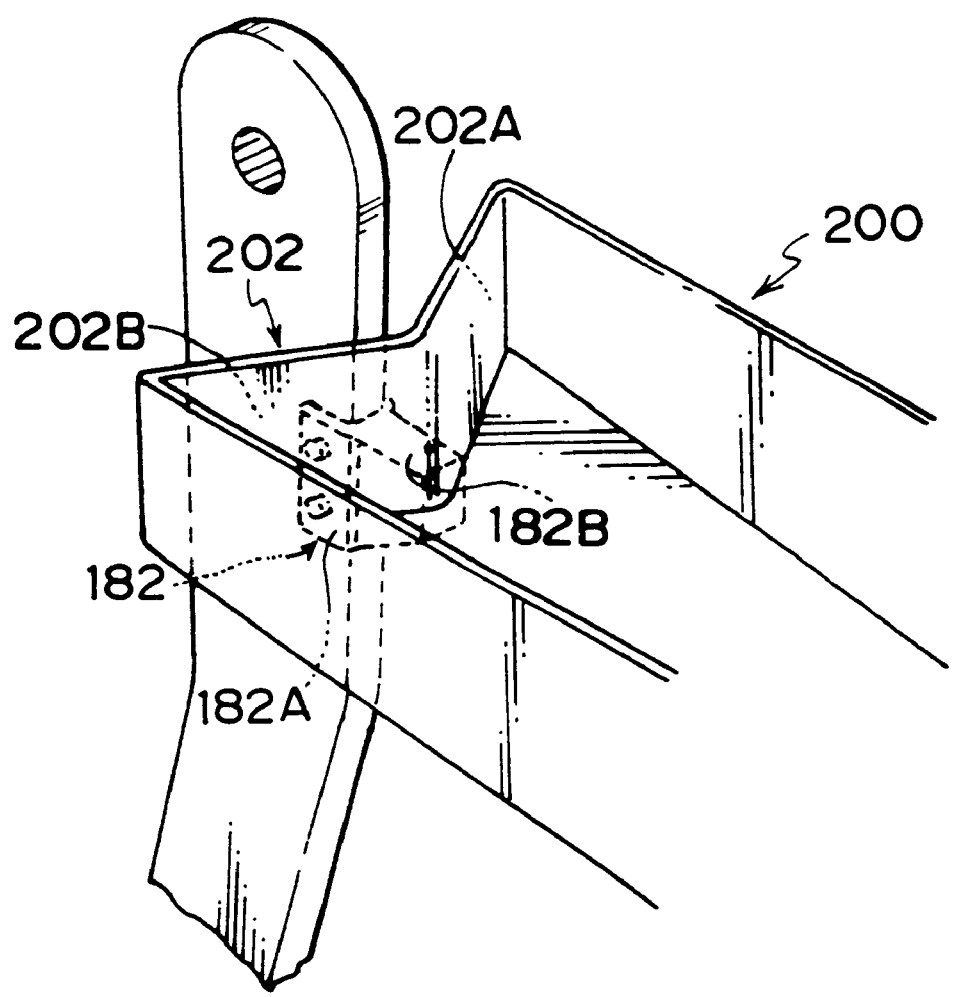

F I G. 1 6
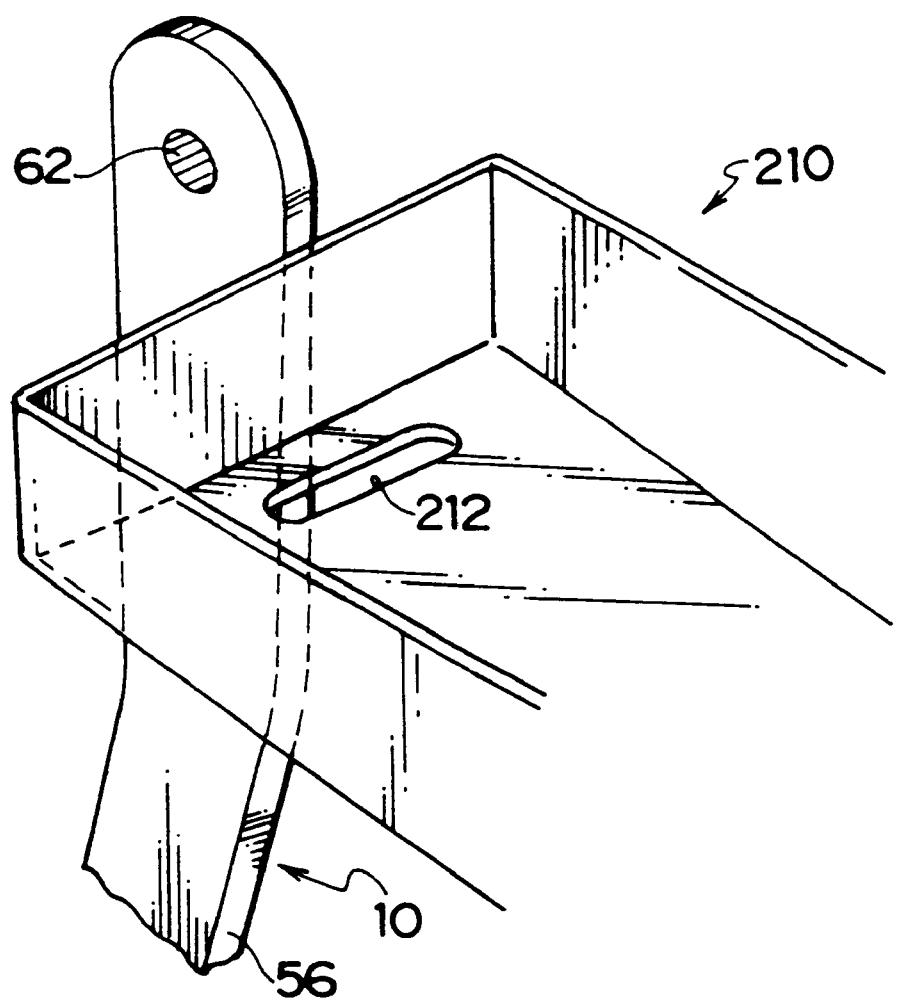

F I G. 1 8
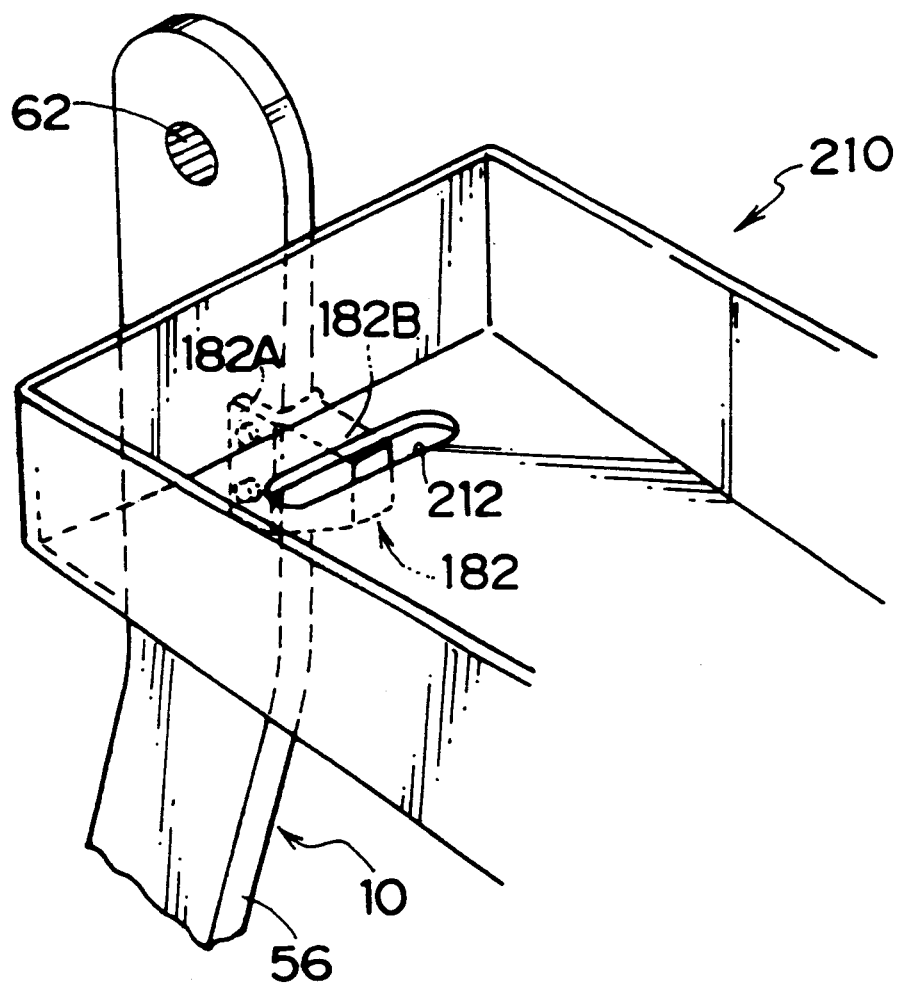

PEDAL DISPLACEMENT-CONTROL STRUCTURE FOR A VEHICLE

BACKGROUND OF THE INVENTION

1. Field of the Invention

The present invention relates to a pedal displacement-control structure for a vehicle.

2. Description of the Related Art

Various counter measures have been conventionally made as a measure when an external force of a predetermined value or greater is applied from the front of a vehicle. As an example of this kind of counter measures, there can be mentioned a structure disclosed in Japanese Utility Model Application Laid-Open (JP-U) No. 1-73464.

Briefly explained, as shown in FIG. 19, in the structure disclosed in this publication, a steering column 402 surrounding a steering shaft 400 goes through between an upper plate member 404 and a tilt bracket 408 comprising a pair of side plate members 406, and these side plate members 406, and is supported by a shaft 410 which supports the lower edge of the steering column 402.

Furthermore, on the lower side of the above-mentioned tilt bracket 408, there is arranged a knee protector 412 which is in a generally arc shape and is elastically deformable. This knee protector 412 is elastically supported on the lower side of the steering column 402 via an elastically deformable stay 414.

According to the above structure, when an external force of a predetermined value or greater is applied from the front of the vehicle, the driver is caused to inertially move forward of the vehicle. In connection therewith, the driver's legs is forced to inertially move toward the same direction while bending, using the knee as the starting point. Therefore, when the knee protector 412 is not arranged, the driver's knee may come into contact with the tilt bracket 408. As described above, however, if the knee protector 412 is arranged on the lower part of the tilt bracket 408, the driver's knee comes into contact only with the knee protector 412.

It seems that the structure having such a knee protector 412 is useful as measures when an external force of a predetermined value or greater is applied from the front of the vehicle. However, it is possible to approach from another point of view as said measures in relation to the driver's leg, and it is important to establish said measures multilaterally in relation to the driver's leg from the view point of multiprotection.

As a result of experiments performed from such a point of view, the present inventors have come to a conclusion that it comes as quite effective counter measures to control the displacement of vehicle pedal such as a brake pedal or the like, in view of the displacement of body panels and the like, and behaviors against the displacement when an external force of a predetermined value or greater is applied from the front of the vehicle.

SUMMARY OF THE INVENTION

In view of the above situation, it is an object of the present invention to provide a pedal displacement-control structure for a vehicle which can control the displacement of the tread of the vehicle pedal, when an external force of a predetermined value or greater is applied from the front of the vehicle.

A pedal displacement-control structure for a vehicle according to the first aspect of the present invention includes a pedal bracket fixed to a first member constituting one portion of a vehicle body which is displaced to rearward of the vehicle when an external force of a predetermined value or greater is applied to the front portion of the vehicle, a suspension-type vehicle pedal whose rotation shaft which forms the center of pivot is supported by the pedal bracket, displacement control means for controlling the displacement of the tread of the vehicle pedal by applying a pressing force frontward of the vehicle about the rotation shaft to the vehicle pedal when the vehicle pedal is displaced to rearward of the vehicle in accordance with the displacement of the first member to rearward of the vehicle, the displacement control means being provided in a second member constituting another portion of on the vehicle body, the second member having a high rigidity and being arranged more rearward of the vehicle than the vehicle pedal, and means for restricting a press-reaction force of a predetermined value or greater from being transmitted to the second member via the displacement control means, when the pressing force is applied to the vehicle pedal from the displacement control means.

The pedal displacement-control structure according to the second aspect has such a structure that, in the first aspect, the vehicle pedal is kept via a coupling portion in a coupled state with means for transmitting a stepping force applied to the tread of the vehicle pedal to a braking device, and the restricting means comprises for canceling the coupled state.

The vehicle pedal displacement-control structure according to the third aspect has such a structure that, in said first aspect, said restricting means is arranged on the displacement control means, and comprises energy-absorbing means for absorbing the press-reaction force from the vehicle pedal.

According to said first aspect, when an external force of a predetermined value or greater is applied to the front portion of the vehicle, the first member is displaced to rearward of the vehicle. Therefore, the pedal bracket fixed to the first member is also displaced to rearward of the vehicle, and in connection therewith, the vehicle pedal whose rotation shaft is supported by the pedal bracket is also displaced in the same direction.

Here, in this aspect, the displacement control means is provided on the second member having a high rigidity and is arranged more rearward of the vehicle than the vehicle pedal, and when the vehicle pedal is displaced to rearward of the vehicle in accordance with the displacement of the first member to rearward of the vehicle, a pressing force toward the front portion of the vehicle about the rotation shaft is applied to the vehicle pedal by the displacement control means. Therefore, the tread of the vehicle pedal receives a rotation force toward the front portion of the vehicle about the rotation shaft and is displaced frontward of the vehicle. Thus, in this aspect, when an external force of a predetermined value or greater is applied from the front of the vehicle, the displacement of the tread of the vehicle pedal is controlled.

As described above, when the pressing force frontward of the vehicle about the rotation shaft is applied to the vehicle pedal by the displacement control means, a press-reaction force from the vehicle pedal affects the displacement control means. This press-reaction force is transmitted to the second member provided with the displacement control means. Though this second member has a high rigidity, it is desired to reduce the transmission load since it is arranged more rearward of the vehicle than the vehicle pedal. Therefore, in this aspect, in addition to the structure in which the above-mentioned displacement control means is provided, means for restricting a press-reaction force of a predetermined value or greater from being transmitted to the second member via the displacement control means is provided, hence the load transmitted to the second member is reduced.

According to the above-mentioned aspect embodiment, when the press-reaction force is applied from the vehicle pedal to the displacement control means through the above-mentioned process, the canceling means cancels the coupled state of the vehicle pedal and the means for transmitting a stepping force applied to the tread of the vehicle pedal to the braking device. Therefore, the press-reaction force after the coupled state is canceled by the canceling means is not transmitted to the second member, and only the press-reaction force before the cancel is transmitted to the second member. Therefore, the load to be transmitted to the second member is reduced. That is this aspect can reduce the load transmitted to the second member by intercepting the transmission of the press-reaction force.

According to the above-mentioned third aspect, when the press-reaction force is applied from the vehicle pedal to the displacement control means through the above-mentioned process, the press-reaction force from the vehicle pedal is absorbed by the energy-absorbing means provided in the displacement control means per se. Hence, the press-reaction force absorbed by the energy-absorbing means is not transmitted to the second member, and only the press-reaction force before the absorption is transmitted thereto. Therefore, the load to be transmitted to the second member is reduced. That is, the aspect can reduce the load transmitted to the second member by attenuating said press-reaction force in the middle of the transmission of the press-reaction force.

The vehicle pedal displacement-control structure according to the fourth aspect of the present invention includes a pedal bracket fixed to a first member, constituting one portion of a vehicle body, which is displaced to rearward of the vehicle when an external force of a predetermined value or greater is applied to the front portion of the vehicle, a suspension-type vehicle pedal whose rotation shaft which forms the center of pivot is supported by the pedal bracket, displacement control means provided on a second member constituting another portion of the vehicle body for controlling the displacement of the tread of the vehicle pedal by applying a pressing force toward the front portion of the vehicle about the rotation shaft to the vehicle pedal when the vehicle pedal is displaced to rearward of the vehicle in accordance with the displacement of the first member to rearward of the vehicle, the displacement control means having high rigidity and being arranged more rearward of the vehicle than the vehicle pedal, and restraining means provided on one of the displacement control means and the vehicle pedal, for restraining the relative displacement in pressed positions of the displacement control means and the vehicle pedal when a pressing force is applied to the vehicle pedal from the displacement control means.

The vehicle pedal displacement-control structure according to the fifth aspect has such a structure that, in the fourth aspect, the restraining means is a deformable portion which deforms when the displacement control means receives the press-reaction force from the vehicle pedal.

According to the above-mentioned fourth aspect, when an external force of a predetermined value or greater is applied to the front of the vehicle, the first member is displaced to rearward of the vehicle. Therefore, the pedal bracket fixed to the first member is also displaced to rearward of the vehicle, and in connection therewith, the vehicle pedal whose rotation shaft is supported by the pedal bracket is also displaced in the same direction.

Here, in this aspect, the displacement control means is provided on the second member having a high rigidity and arranged substantially more rearward of the vehicle than said vehicle pedal, and when the vehicle pedal is displaced to rearward of the vehicle with the displacement of the first member to rearward of the vehicle, a pressing force toward the front of the vehicle about the rotation shaft is applied to the vehicle pedal by the displacement control means. Therefore, the tread of the vehicle pedal receives a rotation force toward the front portion of the vehicle about the rotation shaft and is displaced frontward of the vehicle. Thus, in this aspect, when an external force of a predetermined value or greater is applied from the front of the vehicle, the displacement of the tread of vehicle pedal is controlled.

As described above, when the pressing force toward the front side of the vehicle about the rotation shaft is applied to the vehicle pedal by the displacement control means, a press-reaction force from the vehicle pedal affects the displacement control means. Therefore, depending upon the magnitude of said press-reaction force and the direction to be affected, the displacement control means may be relatively displaced (slipped out of place) with respect to the vehicle pedal. Furthermore, the vehicle pedal may not be displaced directly toward the lower part of the vehicle but slipped out of place and displaced in a width direction of the vehicle, depending upon the displacement behavior of the first member.

According to this aspect, however, the restraining means which restrains the relative displacement in the pressed positions of the displacement control means and the vehicle pedal when the pressing force is applied to the vehicle pedal from the displacement control means is provided on the displacement control means or the vehicle pedal, hence the vehicle pedal is securely pressed by the displacement control means. Therefore, the vehicle pedal is displaced securely frontward of the vehicle about the rotation shaft.

According to the fifth aspect, the displacement control means receives the press-reaction force from the vehicle pedal, and the displacement control means or the vehicle pedal is deformed, thereby said restraining means is formed, hence the energy is absorbed by this deformation process. Accordingly, the load transmitted from the displacement control means to the second member is reduced.

BRIEF DESCRIPTION OF THE DRAWINGS

FIG. 3 is a motion diagram showing the manner in which the brake pedal is disengaged from the state showing in FIG. 2.

FIG. 15 is a perspective view corresponding to FIG. 14 which shows the embodiment in which a regulation block is added to the structure of the sixth embodiment.

FIG. 16 is a perspective view showing the main part of a pedal displacement-control structure for a vehicle according to the seventh embodiment on an enlarged scale.

FIG. 18 is a perspective view corresponding to FIG. 16 which shows the embodiment in which a regulation block is added to the structure of the seventh embodiment.

DESCRIPTION OF THE PREFERRED EMBODIMENT

[The First Embodiment]

The first embodiment will now be described with reference to FIGS. 1 to 3.

Figure 1:
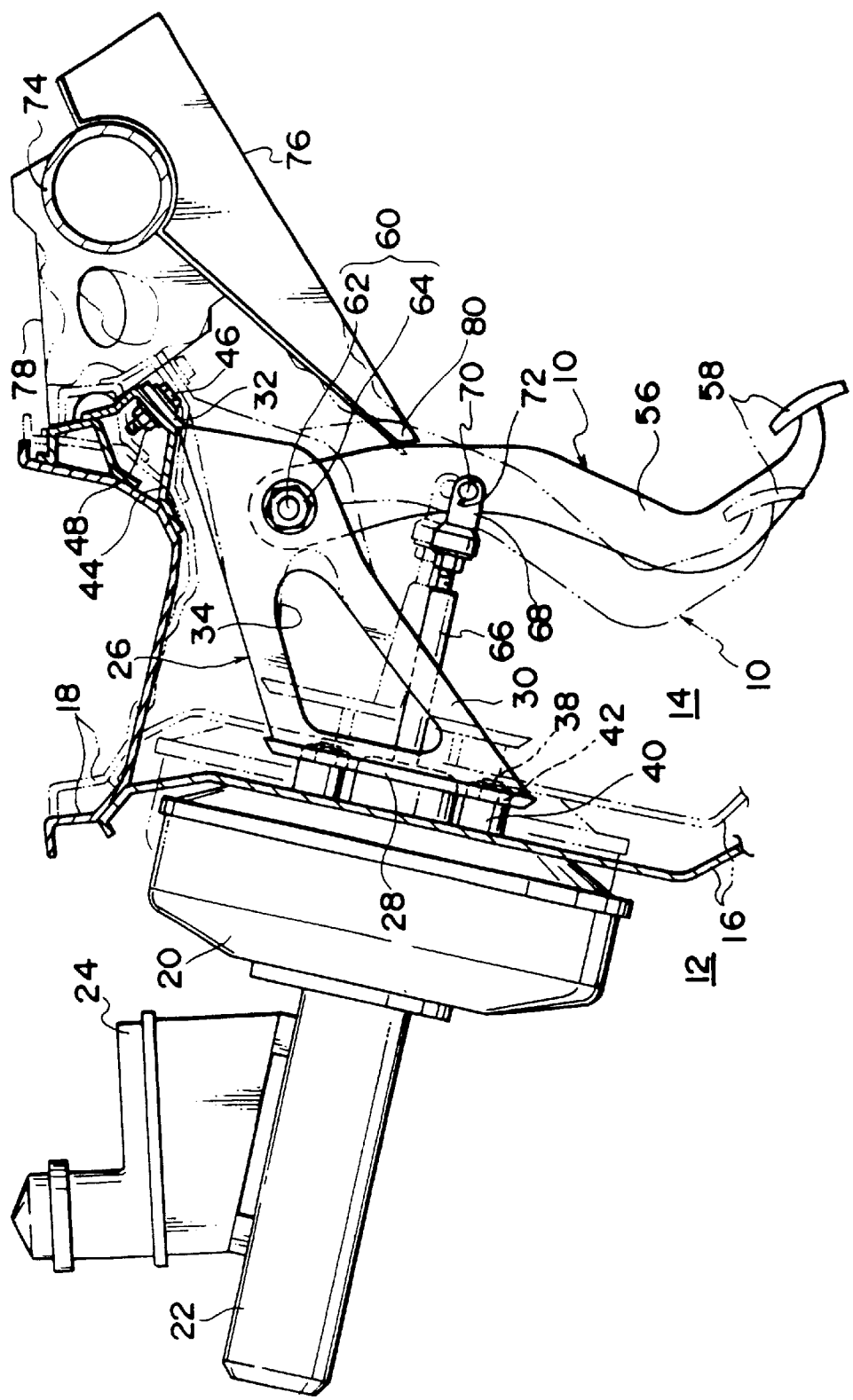
FIG. 1 is a side view showing the overall structure of a pedal displacement control structure for a vehicle according to the first embodiment.

In FIG. 1, there is schematically shown a peripheral structure of the suspension-type brake pedal 10 as a vehicle pedal. With this Figure, the overall structure of the peripheral structure including the brake pedal 10 will be described.

A dash panel 16 is disposed substantially vertically as a first member constituting one portion of a vehicle body, at a position partitioning an engine room 12 from vehicle compartment interior space 14. The upper end of the dash panel 16 is secured to the front side of the cowl inner panel which is arranged in such a manner that the transverse direction of the vehicle is the longitudinal direction and constitutes a portion of a cowl by spot welding or the like. Furthermore, the lower end of the dash panel 16 is secured to a floor panel (not shown) by spot welding or the like.

A brake booster 20 for boosting the stepping force of a driver which is applied to the brake pedal 10, a master cylinder 22 for converting the pressure boosted by the brake booster 20 to hydraulic pressure, and a reservoir tank 24 for storing and replenishing a brake fluid while following a change in the volume of a hydraulic systerm are integrally disposed on the vehicle front side of the dash panel 16.

On the other hand, to the rear side of the dash panel 16 is arranged a pedal bracket 26 which supports the brake pedal 10 pivotably. The pedal bracket 26 is composed of a base plate 28 constituting a mounting plane to the dash panel 16, a pair of side plates 30 extended in parallel to rearward of the vehicle from the base plate 28 and a top plate 32 connecting the upper ends of these side plates 30, and as a whole, the pedal bracket 26 is formed in a substantially U-shape whose lower end is opened. Furthermore, in a predetermined position on the front side of each side plate 30, an opening 34 is formed in order to reduce the rigidity against the longitudinal direction of the vehicle.

Next, the coupling structure of the above-mentioned pedal bracket 26 to the vehicle body will be described. Cylindrical collars 40 into which inserting stud bolts 38 projecting from the brake booster 20 are inserted are fixed to four corners of the front side face of the base plate 28 arranged on the front side of the pedal bracket 26. The base plate 28 is secured to the dash panel 16 by screwing nuts 42 to the stud bolts 38 inserted inside in a state that these collars 40 are caused to abut against the dash panel 16. Thereby, the front side of the pedal bracket 26 is coupled to the dash panel 16. It is also possible to fix mounting bolts by inserting them from the base plate 28, while weld nuts are welded in advance on the front face of the dash panel 16. Furthermore, a dash insulator (not shown) which is used as an acoustic insulation intervenes between the dash panel 16 and the base plate 28.

On the other hand, on the rear end side of the pedal bracket 26, a rear end of a top plate 32 is coupled to a cowl inner reinforcement 44 by being fixed by bolts 46 and weld nuts 48. Specifically, a cowl inner reinforcement 44 which reinforces a cowl inner panel 18 and has weld nuts 48 welded on the inner face thereof is bonded by welding to the rear end of the cowl inner panel 18. And, bolts 46 are screwed into the weld nuts 48 in a state that the rear end of the top plate 32 abuts against the cowl inner reinforcement 44, thereby the rear end of the pedal bracket 26 is coupled to the cowl inner reinforcement 44.

The suspension-type brake pedal 10 is located between the pair of side plates 30 of the above-mentioned pedal bracket 26. The brake pedal 10 is composed of a pedal support 56 which is formed by properly bending a narrow plate, and a pedal pad 58 which is provided at the lower end of the pedal support 56 and used as a tread on which the stepping force of the driver is applied. In addition, a return spring (not shown) is engaged with the pedal support 56 of the brake pedal 10, and the brake pedal 10 is always urged in the direction returning to the original position by the return spring.

Furthermore, a rotation shaft 60 is provided on the upper end of the pedal support 56 of the brake pedal 10, and the rotation shaft 60 is rotatably supported by the pair of side plates 30 of the pedal bracket 26. Briefly speaking with respect to one example of the structure of the rotation shaft 60, while substantially cylindrical pedal boss is inserted into a breakthrough formed at the upper end of the pedal support 56, cylindrical bushes are respectively fitted to the both ends of the pedal boss. After cylindrical collars are inserted into the both bushes, a mounting bolt 62 is inserted therein from the outside of one side plate 30, and is screwed with a nut 64 via a washer from the outside of the other side plate 30, thus the rotation shaft 60 is formed.

Furthermore, to the middle portion of the pedal support 56 of the brake pedal 10 is coupled a tip portion of a push rod (operating rod) 66 which projects from the brake booster 20, as transmission means to go through the dash panel 16. Specifically, a clevis 68, having a cross section generally in an U-shape is attached to the tip portion of the push rod 66. The pedal support 56 is inserted into the clevis 68, a clevis pin 70 penetrates both leg plates of the clevis 68 and the pedal support 56, and a split pin 72 or the like is engaged with the penetrated ends of the clevis pin 70, thus the push rod 66 and the pedal support 56 are coupled so as to be relatively rotatable to each other.

Roughly rearward of the vehicle body of the above-mentioned brake pedal 10 is arranged an inner panel reinforcement 74 as the second member constituting one portion of the vehicle body. The second member is a tubular member having high rigidity. The inner panel reinforcement 74 is a member conventionally arranged in such a manner that the vehicle transverse direction is the longitudinal direction. To a predetermined position in the longitudinal direction of the inner panel reinforcement 74 is secured a steering support 76 supporting a steering column (not shown) which is almost in a H shape in plan view. In addition, in a position adjacent to the steering support 76 in the inner panel reinforcement 74, a slab-shaped cowl toe brace 78 is disposed to connect the inner panel reinforcement 74 and the cowl inner reinforcement 44 and stabilize them in the aspect of oscillation.

In this embodiment, the steering support 76 is inclined downward to the front side of the vehicle, and a pressing portion 80 is formed in a part thereof as displacement control means (a pushing member in a lower concept). The tip of the pressing portion 80 is located slightly rearward of the pedal support 56 of the brake pedal 10 (the position relationship in the vehicle longitudinal direction of the pressing portion 80 to the pedal support 56). The tip of the pressing portion 80 is also located in the middle of the rotation shaft 60 and the clevis pin 70 in the pedal support 56 (the position relationship in the vertical direction of the pressing portion 80 to the pedal support 56).

Figure 2:
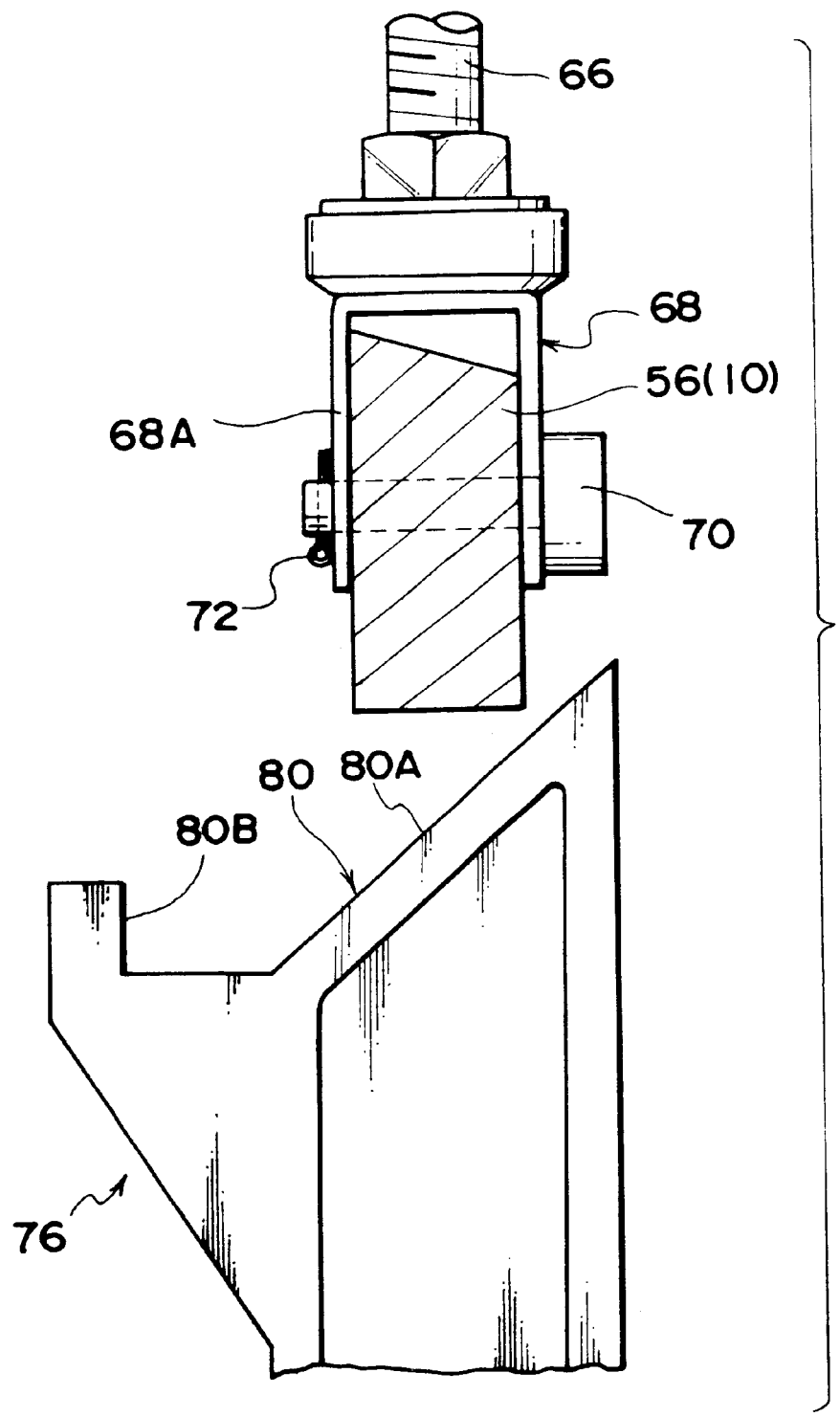
FIG. 2 is a plan view showing the structure of the pressed portion shown in FIG. 1 on an enlarged scale.

Furthermore, as shown in FIG. 2, on the tip of the above-mentioned pressing portion 80, a tapered portion 80A inclined at a predetermined angle and a hook-shaped engagement portion 80B arranged adjacent thereto are integrally formed. The tapered portion 80A is located rearward of the pedal support 56 and inclined at a predetermined angle rearward of the vehicle along the vehicle transverse direction. In addition, the distance from the end of the tapered portion 80A to the inside of the engagement portion 80B corresponds substantially to the thickness of the pedal support 56. Incidentally, the tapered portion 80A and engagement portion 80B constitute the "inhibiting means" and the "canceling means".

Next, the operation and the effect of this embodiment will be described.

As shown in a solid line in FIG. 1, when the brake is not operated, the brake pedal 10 is held in its original position by the urging force of the return spring. In addition, when the driver steps down on the pedal pad 58 of the brake pedal 10 from this state, the brake pedal 10 is swung substantially toward the front of the vehicle about the rotation shaft 60, and the push rod 66 is pushed substantially toward the front portion of the vehicle. Thereby, the stepping force applied to the pedal pad 58 by the driver is boosted by the brake booster 20 via the push rod 66, and then transmitted to the master cylinder 22 constituting a part of the braking device and converted to hydraulic pressure by the master cylinder.

On the other hand, when an external force of a predetermined value or greater is applied from the front of the vehicle, the load at that time is input to a dash panel 16 via the master cylinder 22 and the brake booster 20. Therefore, as shown in a two-dot line in FIG. 1, the dash panel 16 may be displaced substantially toward the rear of the vehicle. In this case, the pedal bracket 26 is also displaced to rearward of the vehicle, as shown in a two-dot line, with the rearward displacement of the dash panel 16. However, the rear end of the pedal bracket 26 (the rear end of the top plate 32) is not so much displaced to rearward of the vehicle as the front end of the pedal bracket 26. This is because the rear end of the pedal bracket 26 is fixed to the cowl inner reinforcement 44, and this cowl inner reinforcement 44 is supported via the cowl toe brace 78 to the inner panel reinforcement 74 having high rigidity which is hardly displaced to rearward of the vehicle even if the external force of a predetermined value or greater is applied from the front of the vehicle. In addition, the opening 34 is formed in the pair of side plates 30 of the pedal bracket 26, and the rigidity against the longitudinal direction of the vehicle is intentionally set low. As a result, the pedal bracket 26 is displaced to rearward of the vehicle while bending toward the longitudinal direction of the vehicle.

Here, in this embodiment, the steering support 76 inclined downward to the front side of the vehicle is secured to the inner panel reinforcement 74 having a high rigidity which is hardly displaced to rearward of the vehicle even if the external force of a predetermined value or greater is applied from the front of the vehicle, and the pressing portion 80 is formed in a part of the steering support 76. Hence, even if the external force is applied, the pressing portion 80 is not displaced rearward. Therefore, when the brake pedal 10 is displaced to rearward of the vehicle with the rearward displacement of the pedal bracket 26, the pedal support 56 of the brake pedal 10 (in the middle of the rotation shaft 60 and the clevis pin 70) abuts against the pressing portion 80. Therefore, the brake pedal 10 receives a pressing force toward the front side of the vehicle about the rotation shaft 60 from the pressing portion 80. Hence, the brake pedal 10 is rotationally displaced toward the front side of the vehicle about the rotation shaft 60, while pressing down the push rod 66. As a result, the pedal pad 58 of the brake pedal 10 is also displaced frontward of the vehicle.

In other words, according to this embodiment, when the external force of a predetermined value or greater is appied from the front side of the vehicle, it becomes possible to control the brake pad in such a manner that the pedal pad 58 of the brake pedal 10 is displaced largely frontward of the vehicle. As a result, when the external force of a predetermined value or greater is applied from the front of the vehicle, bending of the knee of the driver due to the inertial movement of the driver can be suppressed, as well as the knee of the driver can be kept away from the steering column.

In addition to the basic operation and effect in this embodiment described above, this embodiment can obtain the operation and effect described below.

As described above, when the external force of a predetermined value or greater is applied from the front of the vehicle, the pedal support 56 is pressed from its rear side by the pressing portion 80 provided on the steering support 76, and when only the rotation displacement toward the front of the vehicle about the rotation shaft 60 is given to the brake pedal 10, a press-reaction force is input from the pedal support 56 to the pressing portion 80 at the time of pressing. And this press-reaction force is transmitted to the inner panel reinforcement 74 via the steering support 76.

However, in this embodiment, since the tapered portion 80A inclined at a predetermined angle and the hook-shaped engagement portion 80B provided adjacent thereto are integrally formed at the tip portion of the pressing portion 80, as shown in FIG. 3, when the pedal support 56 abuts against the pressing portion 80, the pedal support 56 relatively slides to the vehicle transverse direction along the tapered portion 80A of the pressing portion 80. The sliding of the pedal support 56 continues until it engages the hook-shaped engagement portion 80B formed adjacent to the tapered portion 80A, and during this process, the split pin 72 is broken and one side portion 68A of the clevis 68 is deformed as shown in the drawing by the pedal support 56. As a result, the pedal support 56 is disengaged from the clevis pin 70 to release or cancel the coupled state of the push rod 66 and the brake pedal 10. Hence, the transmission of the press-reaction force is intercepted. Hence, the press-reaction force after the release or cancel of the coupled state (after the transmission is intercepted) cannot be transmitted to the inner panel reinforcement 74, and what is transmitted to the inner panel reinforcement 74 is only the press-reaction force applied before the release of the coupled state. As a result, according to this embodiment, it can be prevented that the press-reaction force has an effect on the inner panel reinforcement 74.

Incidentally, "press-reaction force of a predetermined value or greater" in the above first embodiment means a force exceeding the press-reaction force occurring due to the application of the pressing force sufficient to press the brake pedal 10 toward the front side of the vehicle (pushing load).

Furthermore, in this embodiment, since it has such a structure that the transmission of the press-reaction force is intercepted, as described above, the press-reaction force transmitted to the inner panel reinforcement 74 can be securely reduced.

[The Second Embodiment]

The second embodiment will now be described with reference to FIGS. 4 to 6. With regard to the same components as in the first embodiment described above, the same reference numerals are put thereto and their explanations will be omitted.

Figure 4:
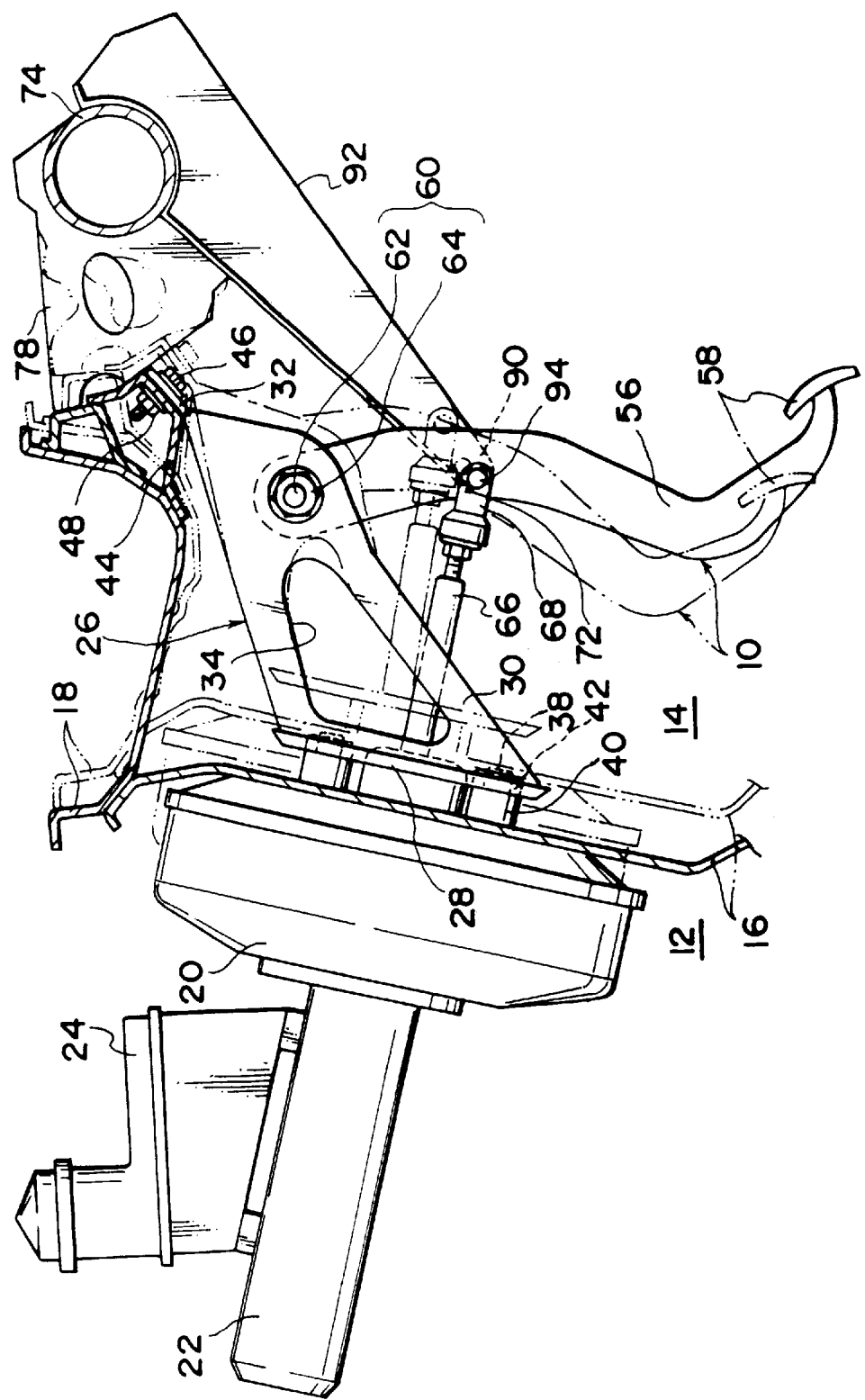
FIG. 4 is a side view showing the overall structure of a pedal displacement control structure for a vehicle according to the second embodiment.
Figure 5:
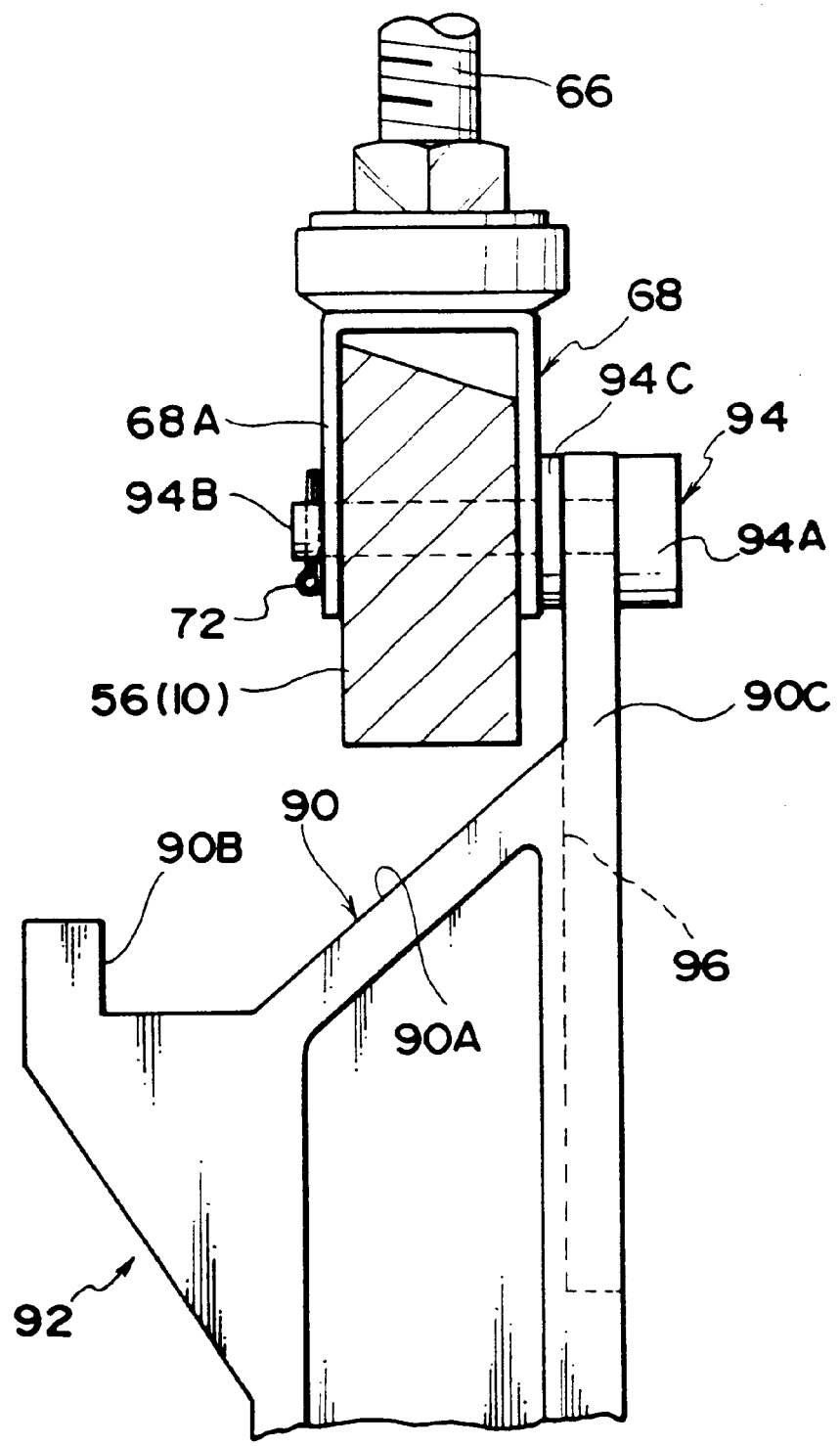
FIG. 5 is a plan view showing the structure of the pressed portion shown in FIG. 4 on an enlarged scale.
Figure 6:
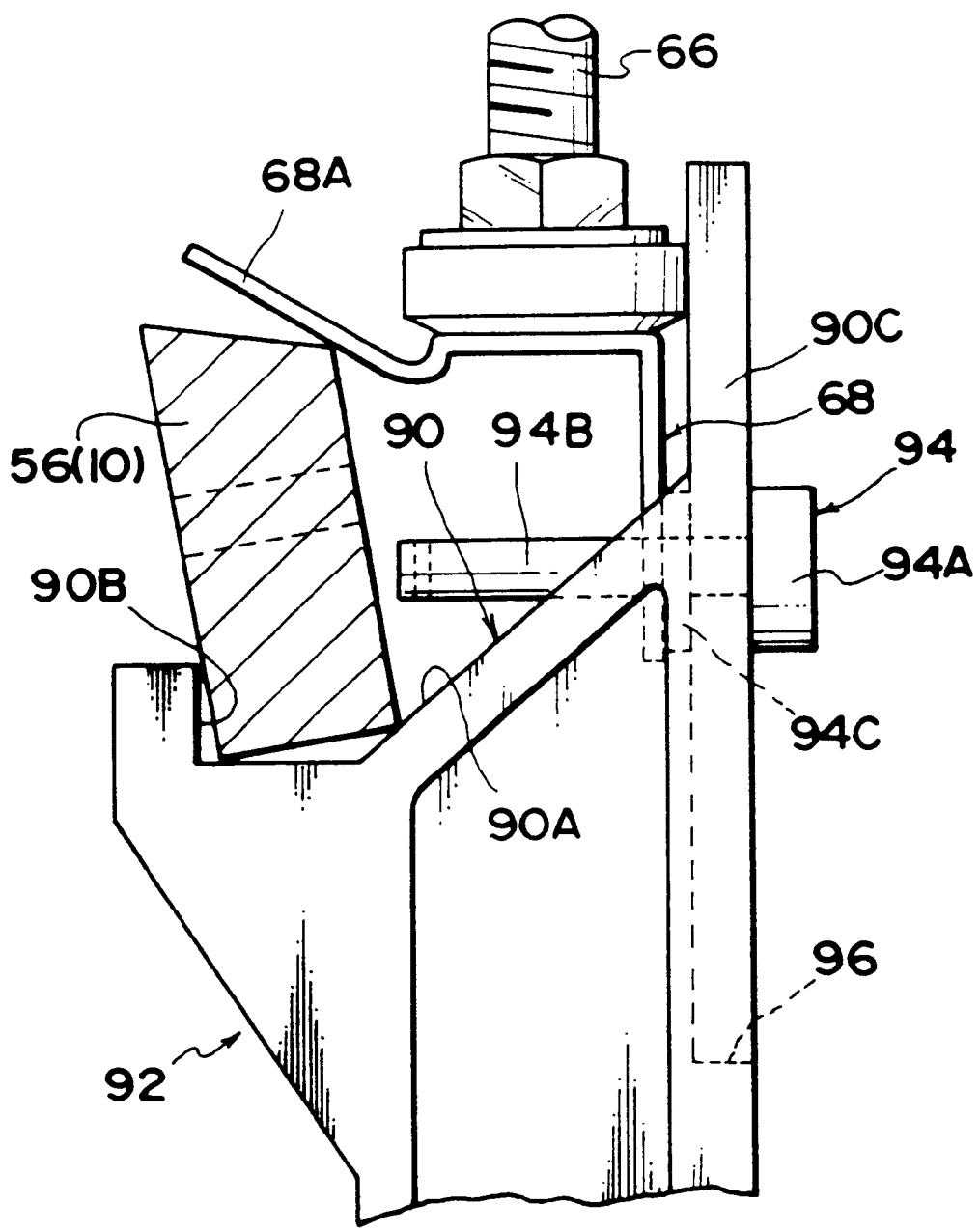
FIG. 6 is a motion diagram showing the manner in which the brake pedal is disengaged from the state showing in FIG. 5.

As shown in FIG. 4 and FIG. 5, in this embodiment, in addition to a tapered portion 90A and an engagement portion 90B having the same structure with the tapered portion 80A and the engagement portion 80B in the first embodiment described above (only these portions have different reference numerals, though they have the same structure as those of the above first embodiment), a pressing portion 90 as displacement control means having a coupling portion 90C is formed integrally in a steering support 92. The coupling portion 90C is formed adjacent to the tapered portion 90A, and extended toward a clevis pin 94 (substantially downward to the front of the vehicle). In the middle of the height direction of the coupling portion 90C, an elongated hole 96 is formed along the longitudinal direction of the coupling portion 90C (substantially in the longitudinal direction of the vehicle) In addition, the tip portion of the elongated hole 96 is opened, and the width of the elongated hole 96 is set to be larger than the axial diameter and smaller than the head diameter of the clevis pin 94 described later. And by using this elongated hole 96, the pressing portion 90 and the clevis pin 94 are coupled mutually.

Specifically speaking, the clevis pin 94 in this embodiment is provided with a collar-shaped stopper 94C formed integrally with a head 94A and a shaft 94B. In addition, the position of the stopper 94C to be formed is to be a position spaced apart from the head 94A by a predetermined distance (distance roughly equal to the thickness of the coupling portion 90C of the pressing portion 90). And near the front end portion of the elongated hole 96 of the coupling portion 90C, the portion between the head 94A and the stopper 94C in the shaft 94B of the clevis pin 94 is inserted. In addition, though the longitudinal direction of the elongated hole 96 intersects the moving direction of the clevis pin 94 at the time of the normal braking operation, the width of the elongated hole 96 is set as described above, and the shaft 94B of the clevis pin 94 is mounted in a state that it is inserted near the front end portion of the elongated hole 96, hence no obstruction is caused during the normal braking operation.

With the above structure, the same operation and effect can be obtained, since the second embodiment has basically the same structure as that of the first embodiment.

In addition, this embodiment has such a structure in which the pressing portion 90 is provided with the coupling portion 90C extended to the clevis pin 94, and the clevis pin 94 having the stopper 94C is inserted to the elongated hole 96 of the coupling portion 90C. Therefore, as shown in FIG. 6, even if the pedal support 56 slides along the tapered portion 90A of the pressing portion 90, the coupling portion 90C intervenes between the head 94A and the stopper 94C of the clevis pin 94, hence the clevis pin 94 is not displaced in the sliding direction of the pedal support 56. Namely, in the first embodiment described above, when the pedal support 56 abuts against the tapered portion 80A of the pressing portion 80 and slides from the state shown in FIG. 2, the clevis pin 70 is also displaced in the sliding direction together with the pedal support 56 until the pedal support 56 engages with the engagement portion 90B. And after the pedal support 56 engages with the engagement portion 80B, when one of the leg portions 68A of the clevis the clevis 68 deforms, the clevis pin 70 is displaced in the counter-sliding direction (returns) as a result and becomes the state shown in FIG. 3. Therefore, since the clevis pin 70 is displaced in the sliding direction together with the pedal support 56, there is a difficulty to pull the pedal support 56 out of the pedal support 56. On the contrary, in this embodiment, since the clevis pin 94 is restricted by the coupling portion 90C of the pressing portion 90, the pedal support 56 can be easily disengaged from the clevis pin 94. Therefore, according to this embodiment, since the pedal support 56 is disengaged from the clevis pin 94 at an early stage, it is possible to accelerate the disengagement of the coupled state of the push rod 66 and the brake pedal 10. Hence, the press-reaction force input to the pressing portion 90 can be largely reduced.

[The Third Embodiment]

Figure 7:
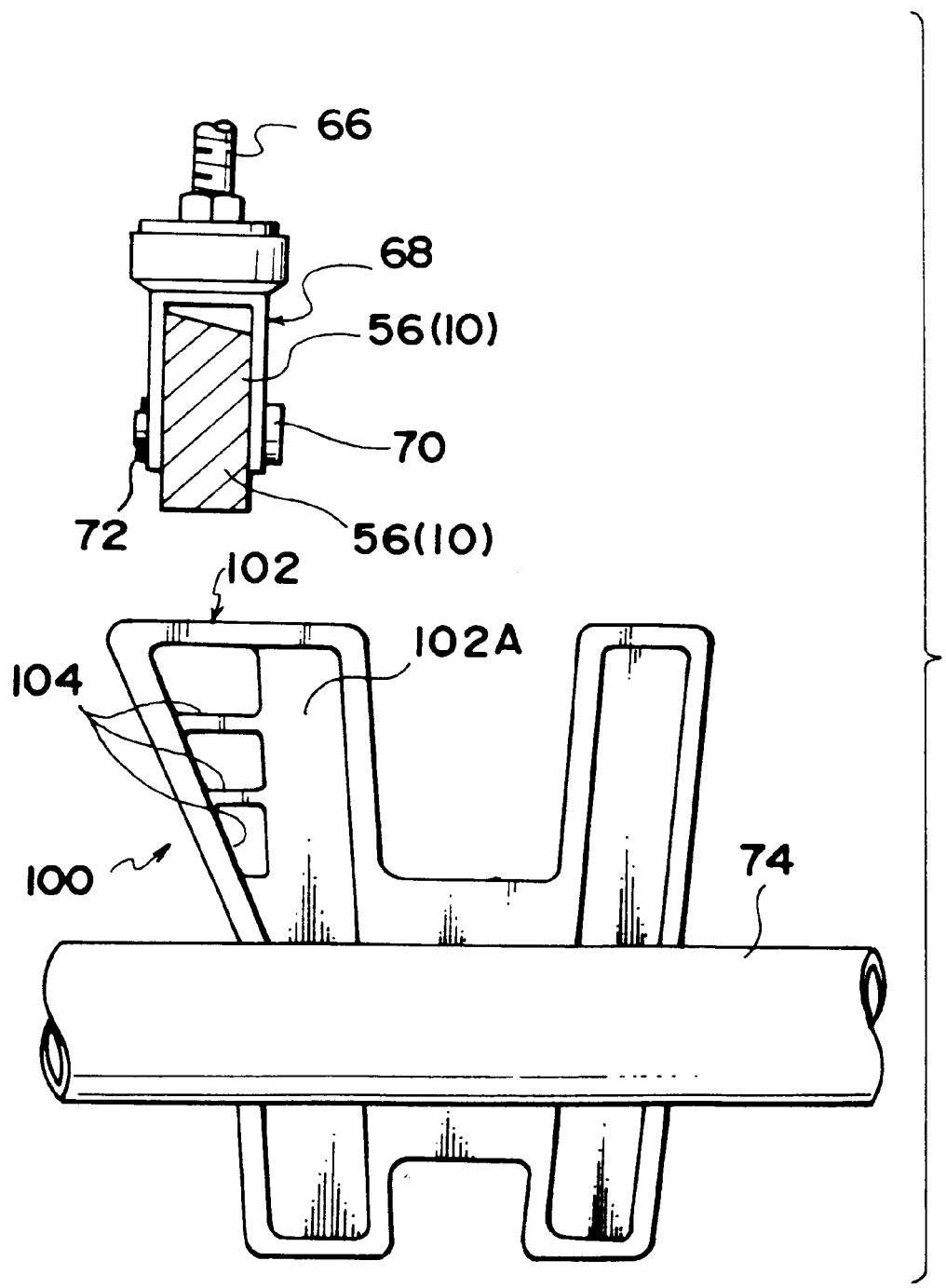
FIG. 7 is a plan view showing the structure of the pressed portion according to the third embodiment.

The third embodiment will now be described with reference to FIG. 7. With regard to the same components as in the first embodiment described above, the same reference numerals are put thereto and their explanations will be omitted.

In this embodiment, a plurality of trapeziform openings 104 are formed as energy-absorbing means (in lower concept, fragile portion) in the bottom plate 102A of the pressing portion 102 as displacement control means provided in the steering support 100. Thereby, the rigidity against the longitudinal direction of the vehicle of the pressing portion 102 of the steering support 100 is reduced intentionally. In addition, it is possible to adopt such a structure in which the plate thickness where the openings 104 are formed is made thin, and all structures are applicable so long as they can absorb a press-reaction force of a predetermined value or greater.

According to the above structure, when the pedal support 56 is pressed toward the front portion of the vehicle by the pressing portion 102, if the press-reaction force input from the pedal support 56 to the pressing portion 102 is a predetermined value or greater, the bottom plate 102A of the pressing portion 102 buckles in the longitudinal direction of the vehicle to absorb the press-reaction force of a predetermined value or greater. That is, in this embodiment, the press-reaction force is attenuated in the middle of the transmission channel of the press-reaction force. Hence, the press-reaction force absorbed by the buckling of the bottom 102A is not transmitted to the inner panel reinforcement 74, and only the press-reaction force before the absorption is transmitted thereto. Therefore, as in the first embodiment described above, the press-reaction force transmitted to the inner panel reinforcement 74 can be reduced.

Furthermore, in this embodiment, the above effect can be obtained only by forming a plurality of openings 104 in the bottom plate portion 102A of the pressing portion 102 of the steering support 100, hence the structure can be made simple and the cost can be reduced.

[The Fourth Embodiment]

The fourth embodiment will now be described with reference to FIGS. 8 to 11. With regard to the same components as in the first embodiment described above, the same reference numerals are put thereto and their explanations will be omitted.

Figure 8:
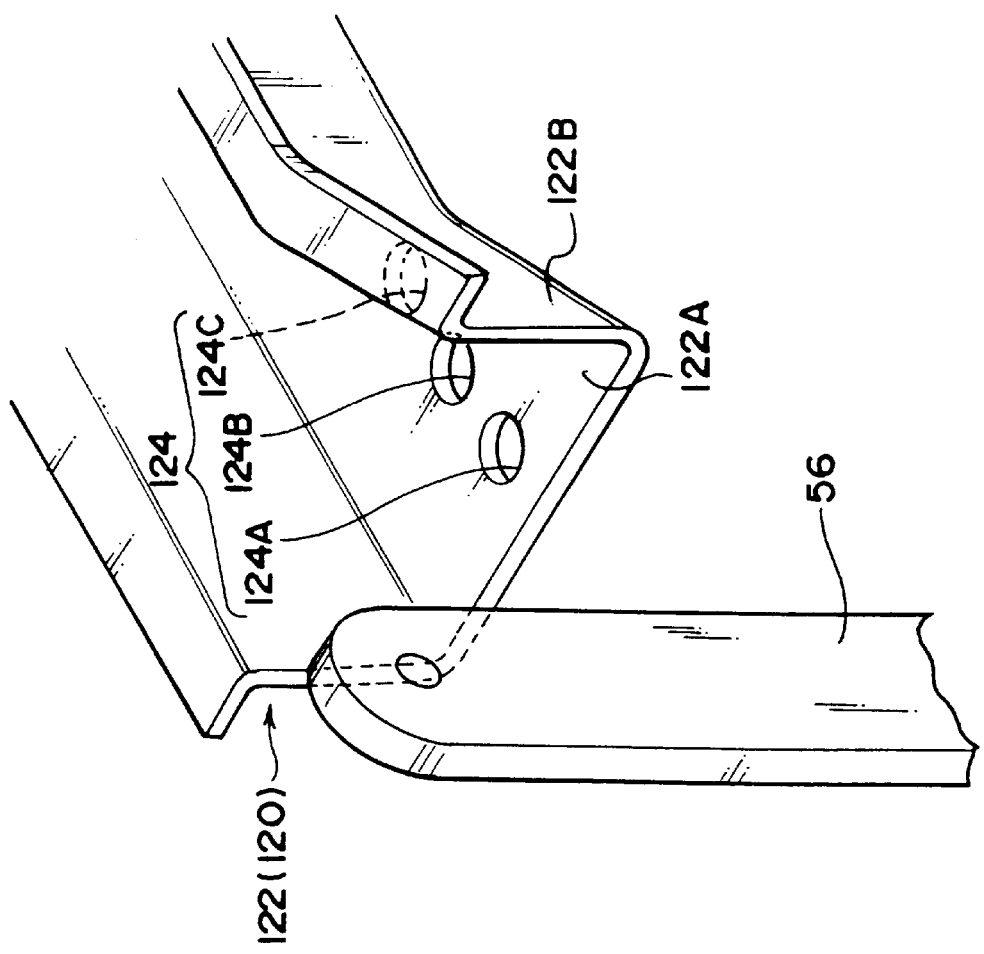
FIG. 8 is a perspective view showing the structure of the pressed portion according to the fourth embodiment in an attached state.
Figure 9:
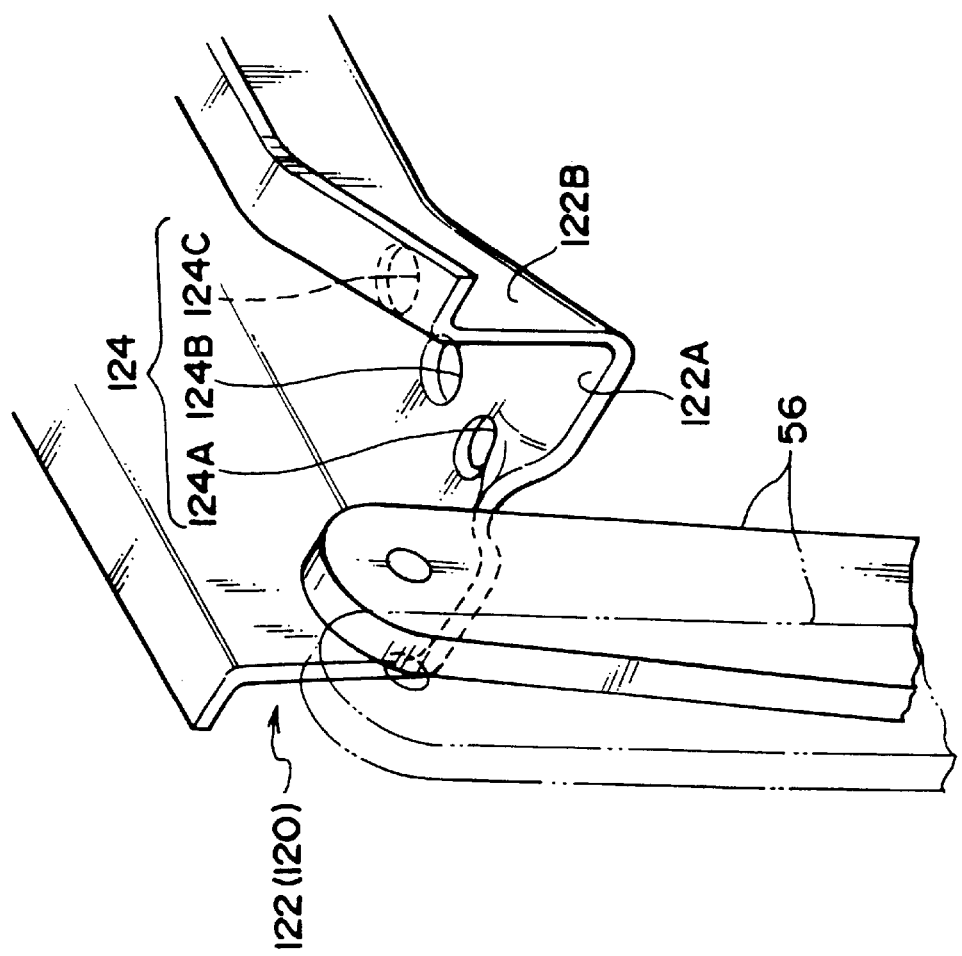
FIG. 9 is a perspective view corresponding to FIG. 8 and showing the original state where the pedal-supporting portion abuts against the pressed portion from the attached state shown in FIG. 8.
Figure 10:
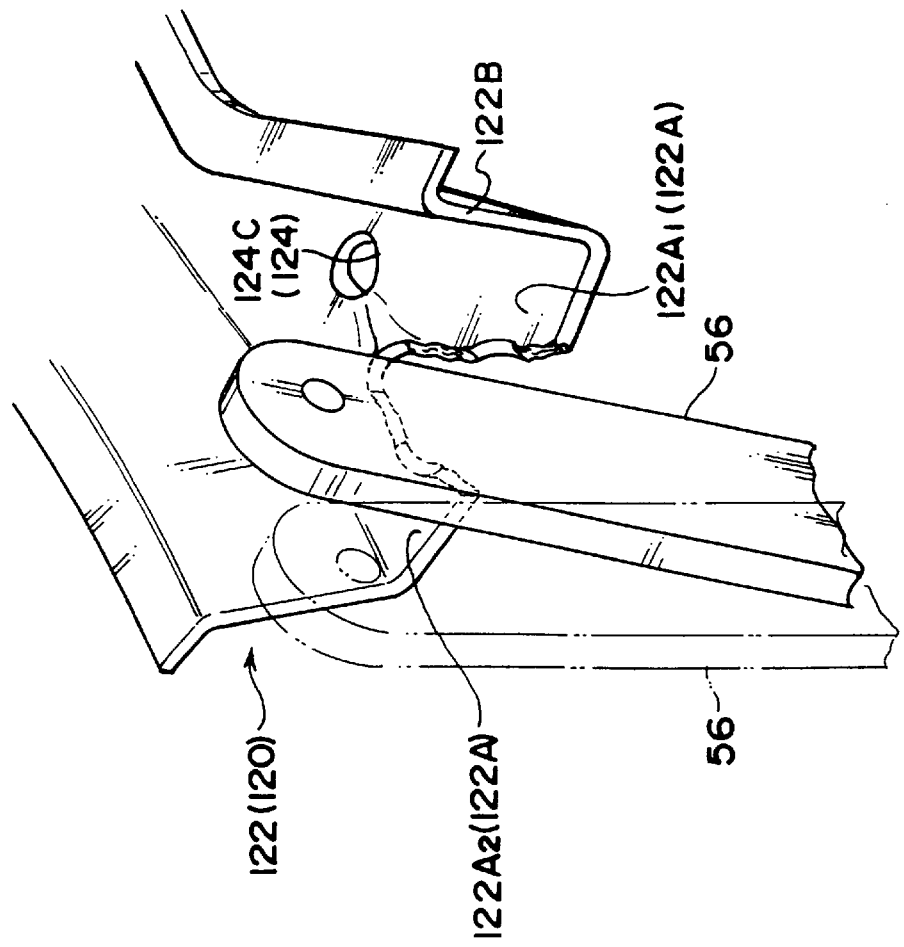
FIG. 10 is a perspective view showing the state where the rip by means of the pedal-supporting portion is advanced from the state shown in FIG. 9.

As shown in FIGS. 8 to 10, in this embodiment, the pressing portion 122 having a cross section of a hat shape is formed as displacement control means provided integrally in the steering support 102. Incidentally, these Figures are perspective views showing the main part on an enlarged scale corresponding to the pressing portion 102 shown in FIG. 7 in the third embodiment described above (that is, the pressing portion 122 in this embodiment).

Explaining in more detail, the tip of the pressing portion 122 is open, and arranged in close proximity on the rear side of the pedal support 56. In addition, the bottom plate portion 122A of the pressing portion 122 and one of the side plate portions 122B are formed in a wider width toward the outside in the thickness direction of the pedal support 56. Furthermore, a plurality of round holes 124 are formed as energy-absorbing means (in a lower concept, fragile portion) in the bottom plate portion 122A of the pressing portion 122 in a predetermined interval along the longitudinal direction of the vehicle. Incidentally, these round holes 124 are set to have the same diameter. Hence, the rigidity against the longitudinal direction of the vehicle of the pressing portion 122 of the steering support 120 is reduced intentionally.

In addition, it is possible to adopt other structures such as forming a concave portion in a V shape (a fragile portion) whose sharp edge looks toward the rear side of the vehicle in a portion where the round holes are formed, in place of the structure forming a plurality of round holes 124. All structures are applicable so long as they can absorb the press-reaction force of a predetermined value or greater.

According to the above structure, when the pedal support 56 is pressed toward the front portion of the vehicle by the pressing portion 122, if the press-reaction force input from the pedal support 56 to the pressing portion 122 is a predetermined value or greater, the bottom plate portion 122A of the pressing portion 122 elastically deforms in such a manner that it is ruptured in the longitudinal direction of the vehicle since the plurality of round holes 124 are formed for controlling the energy-absorbing load in the bottom plate portion 122A of the pressing portion 122, as described above, to reduce the rigidity, hence the press-reaction force of a predetermined value or greater can be absorbed.

In more detail, in the initial stage of pressing, as shown in FIG. 9, only the tip portion of the bottom plate portion 122A of the pressing portion 122 elastically deforms in the longitudinal direction. Incidentally, at this stage, though a front round hole 124A of the round holes 124 formed deforms, it has not been ruptured yet. Subsequently, as shown in FIG. 10, the front round hole 124A and a middle round hole 124B of the round holes 124 of the pressing portion 122 are ruptured sequentially, thus the pedal support 56 ruptures the pressing portion 122. In addition, in this Figure, a rear round hole 124C of the round holes 124 is shown in a state that it is only deformed and not ruptured, however, depending upon the magnitude of the press-reaction force, even the rear round hole 124C is ruptured. Thus, the energy of the press-reaction force applied to the pressing portion 122 is absorbed.

Figure 11:
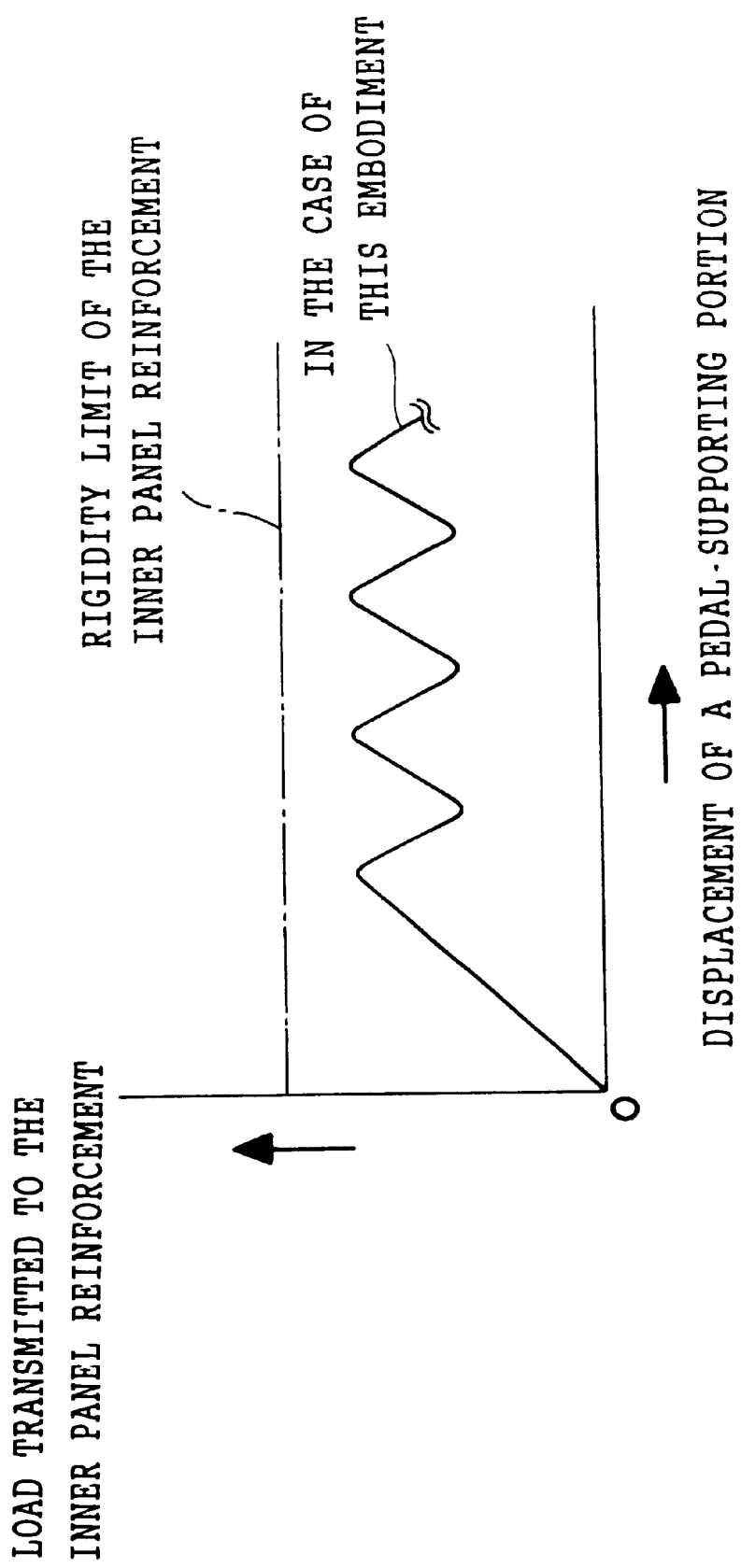
FIG. 11 is a graph showing the load characteristic transmitted to the inner panel reinforcement against the displacement of the pedal-supporting portion to rearward of the vehicle, when the structure according to the fourth embodiment is adopted.

In FIG. 11, "the load characteristic transmitted to the inner panel reinforcement 74 against the displacement of the pedal support 56 to rearward of the vehicle" when the structure of this embodiment is adopted is shown. As seen from this characteristic curve, according to this embodiment, the press-reaction force (load) transmitted to the inner panel reinforcement 74 is reduced. In other word, FIG. 11 directly shows the characteristic when the structure of this embodiment is adopted, but in general, either embodiment described above shows the similar characteristic.

As described above, also in this embodiment, the press-reaction force can be attenuated in the middle of the transmission of the push-reaction force. Therefore, the press-reaction force absorbed by the rupture of the bottom plate portion 122A of the pressing portion 122 is not transmitted to the inner panel reinforcement 74, and only the press-reaction force before the absorption is transmitted thereto. Therefore, as in the first embodiment described above, the press-reaction force transmitted to the inner panel reinforcement 74 can be reduced.

Furthermore, also in this embodiment, the above effect can be obtained only by forming a plurality of openings 124 in the bottom plate portion 122A of the pressing portion 122 integrally formed on the steering support 120, as in the third embodiment described above, hence the structure can be made simple and the cost can be reduced. Furthermore, the control (adjustment) of the energy-absorbing load can be easily performed.

Furthermore, according to this embodiment, since the tip portion of the pressing portion 122 integrally formed on the steering support 120 is made in an open form and a plurality of round holes 124 for controlling the energy-absorbing load described above (for reducing the rigidity) are formed, the bottom plate portion 122A of the pressing portion 122 can be ruptured by the pedal support 56. From other point of view, according to this embodiment, the pedal support 56 can be held by both sides $122A_1$ and $122A_2$ Of the ruptured bottom plate portion 122A of the pressing portion 122. Hence, according to this embodiment, while said pedal support 56 can be restricted so that the pedal support 56 is not shifted or slided in the transverse direction of the vehicle, said pedal support 56 can be restricted so that the pressing portion 122 (as well as the steering support 120) are not shifted relatively in the vertical direction with respect to the pedal support 56.

[The Fifth Embodiment]

Figure 12:
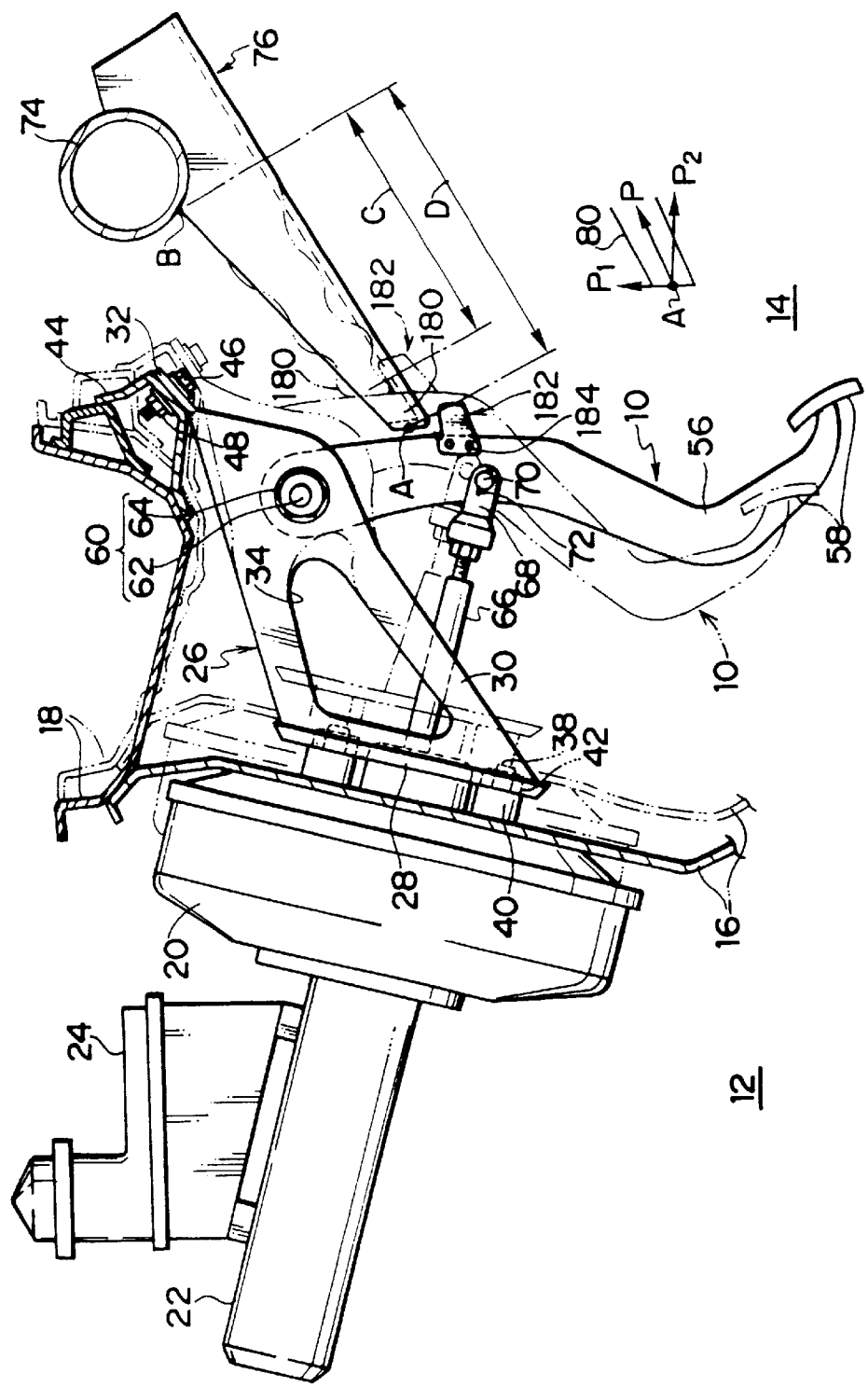
FIG. 12 is a side view showing the overall structure of a pedal displacement control structure for a vehicle according to the fifth embodiment.
Figure 13:
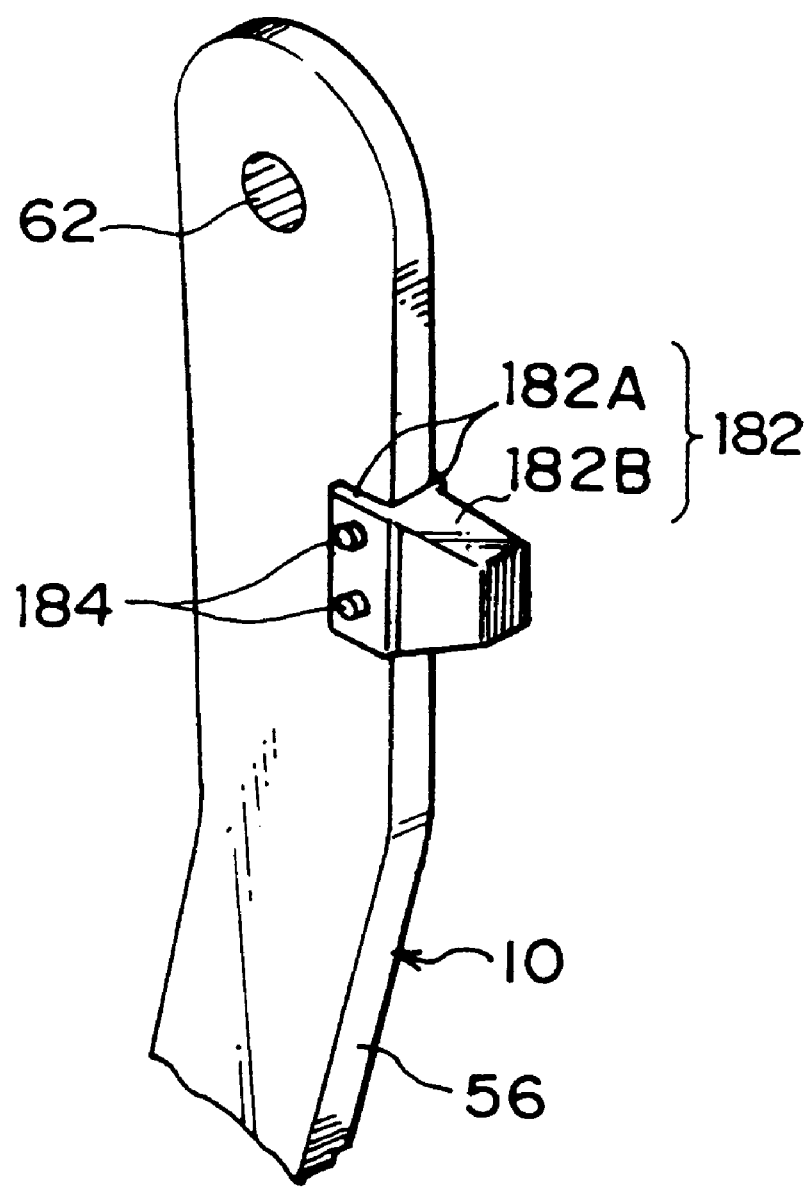
FIG. 13 is a perspective view showing the regulation block shown in FIG. 12 on an enlarged scale.

The fifth embodiment will now be described with reference to FIGS. 12 and 13. With regard to the same members, parts and structures as in the first embodiment described above, the same reference numerals are put thereto and their explanations will be omitted.

In this embodiment, a restraining block 182 projecting to rearward of the vehicle is attached by a rivet 184 in a predetermined position on the rear side of the pedal support 56 in the above-mentioned brake pedal 10 (beneath the tip portion of the pressing portion 80). Specifically, as shown in FIG. 13, the restraining block 182 is composed of a mounting portion 182A formed in an U shape into which the rear end of the pedal support 56 can be inserted, and fixed to said rear end by rivets 184, and a restraining portion 182B extended from the mounting portion 182A to rearward of the vehicle and having the same thickness as the pedal support 56. Incidentally, the rigidity of the restraining block 182 is set high.

Since the other structures of this embodiment are the same as in the first embodiment, the explanation thereof will be omitted.

Since basic operation and effect of this embodiment are the same as those of the first embodiment, the explanations thereof will be omitted. The operation and effect obtained in this embodiment will now be described.

Namely, when a pressing force toward the front of the vehicle about the rotation shaft 60 is pressed on the brake pedal 10 by the pressing portion 80 provided in the steering support 76, the press-reaction force is applied to the pressing portion 80 from the pedal support 56 of the brake pedal 10. Specifically, as shown in FIG. 12, the press-reaction force P is applied to rearward of the vehicle at the press-reaction force affected point A on the tip of the pressing portion 80. The press-reaction force P can be divided into a vertical-direction component $P_1$ and a horizontal-direction component $P_2$. Judging from the situation, however, the horizontal-direction component $P_2$ is larger than the vertical-direction component $P_1$ in general. In addition, the load supporting point B of the steering support 76 is offset in the vertical direction of the vehicle with respect to the affected point A. Hence, a rotation moment to press it down affects the pressing portion 80 of the steering support 76, and by this rotation moment the tip of the pressing portion 80 tends to be relatively displaced (deviated) downward of the vehicle along the rear edge of the pedal support 56.

According to this embodiment, however, since the restraining block 182 is arranged beneath the pressing portion 80 of the pedal support 56 in the brake pedal 10, the tip of the pressing portion 80 is interfered by the restraining portion 182B of the restraining block 182. Therefore, the relative displacement downward of the vehicle (shift or slide downward of the vehicle) of the pressing portion 80 is restrained. Hence, the pressing portion 80 is effectively affected by the press-reaction force P to be buckled in the longitudinal direction (the buckling volume=$D^-C$). It implies that the pedal support 56 of the brake pedal 10 is all the more securely pressed toward the front of the vehicle by the pressing portion 80. Therefore, according to this embodiment, the pedal support 56 of the brake pedal 10 can be securely pressed by the pressing portion 80. As a result, the brake pedal 10 can be displaced securely toward the front of the vehicle about the rotation shaft 60.

This embodiment adopts the structure in which a restraining block 182 which is another part is mounted to the brake pedal 10, however, it is not limited to this structure, and a convex portion corresponding to the restraining block 182 may be integrally provided on the brake pedal 10.

Furthermore, in this embodiment, the relative displacement in the vertical direction of the vehicle with respect to the pressing portion 80 is restrained by the restraining block 182 provided on the brake pedal 10. However, it is not limited to this structure, and the relative displacement in the vertical direction of the vehicle at a position pressed by the pressing portion 80 may be restrained by restraining means provided on the brake pedal 10.

[The Sixth Embodiment]

The sixth embodiment will now be described with reference to FIGS. 14 and 15. With regard to the same components as in the first embodiment described above, the same reference numerals are put thereto and their explanations will be omitted.

Figure 14:
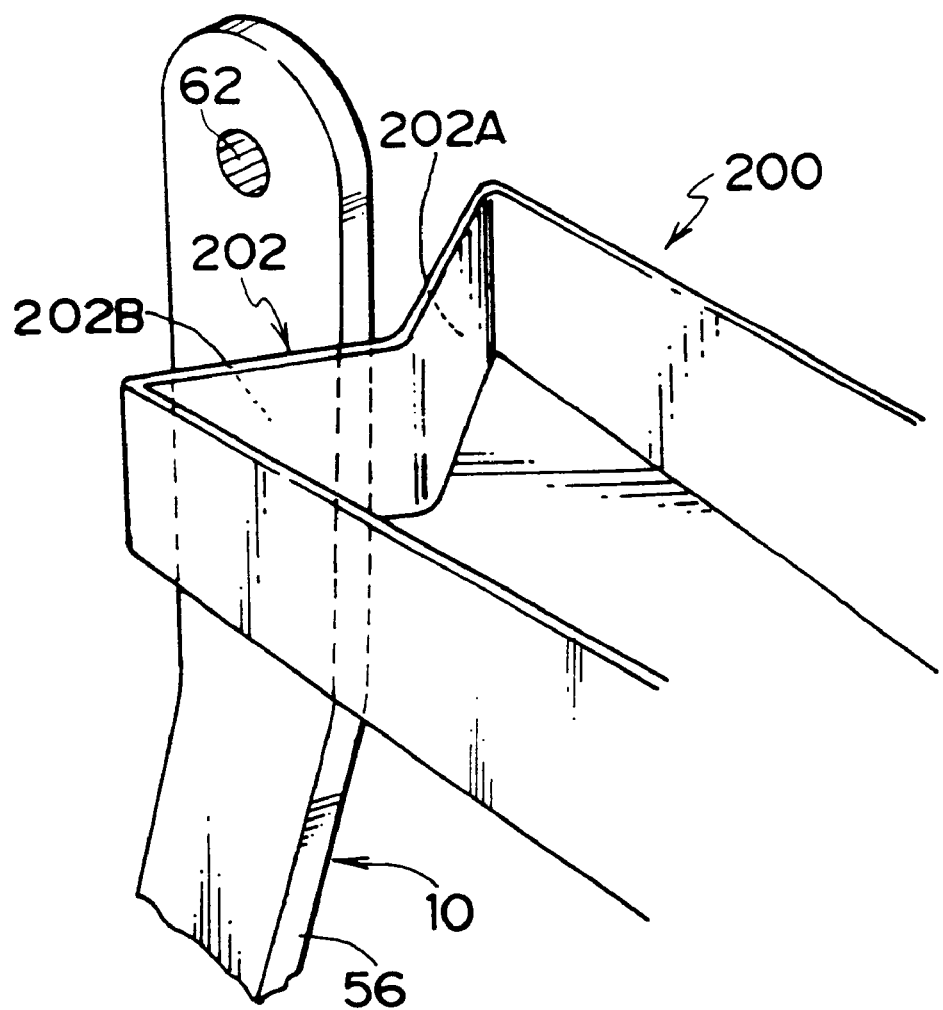
FIG. 14 is a perspective view showing the main part of a pedal displacement-control structure for a vehicle according to the sixth embodiment on an enlarged scale.

As shown in FIG. 14, in this embodiment, the aforementioned restraining block 182 is not provided on the brake pedal 10, but a restraining portion 202 having a pair of restraining planes 202A and 202B inclined at a predetermined angle with respect to the transverse direction of the vehicle and formed in a V shape in plan view is provided on the tip of the pressing portion 200 as displacement control means. In addition, the restraining portion 202 is so arranged that the bottom (that is, a portion where a pair of restraining planes 202A and 202B meet) is opposite to the pedal support 56 of the brake pedal 10.

According to the above structure, the operation and effect described below can be obtained.

Depending upon how an external force affects the front portion of the vehicle, it can be considered that the dash panel 16 is displaced rearward while being inclined in the transverse direction of the vehicle, without being displaced directly downward of the vehicle. In this case, it is supposed that distortion may be caused in the pedal bracket 26 or deviation shift in the transverse direction of the vehicle may be caused in the pressing direction of the brake pedal 10 by the push rod 66, hence the brake pedal 10 is slightly shifted in the transverse direction of the vehicle and displaced rearward without being displaced directly to rearward of the vehicle.

As described above, if the brake pedal 10 is slightly shifted in the transverse direction of the vehicle and displaced rearward, when the pedal support 56 is pressed by the pressing portion 80 (whose tip plane is composed of a flat plane in the transverse direction of the vehicle) according to the afore-mentioned fifth embodiment, the pressing portion 80 presses the pedal support 56 in a position shifted from the normal pressing position. Hence, the pressing force to the pedal support 56 by means of the pressing portion 80 cannot be applied as being set, and in order to avoid it, it is necessary to set said dimension in the width direction counting on certain allowance in the width direction of the pressing portion 80.

According to this embodiment, however, when the brake pedal 10 is shifted in the transverse direction of the vehicle and displaced rearward, the pedal support 56 abuts against either of the restraining planes 202A and 202B of the restraining portion 202, and the pedal support 56 slides toward the bottom part of the restraining portion 202 on said abutted restraining plane 202A or 202B, hence the pedal support 56 is guided to the normal pushed position (that is, a position where a pair of restraining planes 202A and 202B meet). As a result, the pedal support 56 can be securely pushed by the restraining portion 202, and the brake pedal 10 can be securely displaced toward the front side of the vehicle about the rotation shaft 60.

Namely, in the afore-mentioned fifth embodiment, when the pedal support 56 of the brake pedal 10 is pressed by the pressing portion 80 provided in the steering support 76, the restraining block 182 restrains the pressing portion 80 from being relatively displaced downward of the vehicle along the rear edge of the pedal support 56 (restrains the shift or slide in the vertical direction of the vehicle). On the contrary, in this embodiment, when the pedal support 56 of the brake pedal 10 is pressed by the pressing portion 200 provided in the steering support 76, the restraining portion 202 restrains the pedal support 56 from being relatively displaced in the transverse direction of the vehicle with respect to the pressing portion 200 (restrains the shift in the transverse direction of the vehicle).

Furthermore, according to this embodiment, when the press-reaction force applied from the pedal support 56 to the restraining portion 202 is relatively large, the restraining portion 202 is deformed in the direction to which a pair of restraining planes 202A and 202B come close with each other. In other word, even if load in various directions is applied to said pedal support 56 after the pedal support 56 is bitten into the restraining portion 202, the pedal support 56 is not disengaged from the restraining portion 202. That is, the restraint in the transverse direction of the vehicle with respect to the pedal support 56 is increased.

Incidentally, in this embodiment, since a stress is put on the point that the shifting of the brake pedal 10 in the transverse direction of the vehicle with respect to the pressing portion 200 is restrained, the structure in which only a restraining portion 202 is provided on a tip portion of the pressing portion 200 is adopted. As shown in FIG. 15, however, the structure adopted in the fifth embodiment (a structure in which a restraining block 182 is provided on the pedal support 56) may be added. Thus, both the operation and effect of the fifth embodiment and the operation and effect of the sixth embodiment can be obtained simultaneously.

Furthermore, this embodiment adopts a structure in which the relative displacement in the transverse direction of the vehicle at a pressing position of the brake pedal 10 is restrained by the provision of the restraining portion 202 at the tip of the pressing portion 200. However, it is not limited to this structure, and such a structure may be adopted that the relative displacement in the vertical direction of the vehicle at a pressed position of the brake pedal 10 is restrained by the provision of the restraining means provided on the tip of the pressing portion 200.

[The Seventh Embodiment]

The seventh embodiment will now be described with reference to FIGS. 16 and 18. With regard to the same components as in the embodiments described above, the same reference numerals are put thereto and their explanations will be omitted.

This embodiment is characterized in that an elongated hole 212 whose longitudinal direction is in the transverse direction of the vehicle is formed at the tip portion on the bottom of the pressing portion 210 as "displacement control means". Hence, the rigidity on the tip side of the bottom plate portion of the pressing portion 210 in the transverse direction of the vehicle is decreased intentionally. In addition, instead of forming the elongated hole 212, a structure in which the plate thickness of the portion where the elongated hole 212 is formed is made thinner may be adopted, and all structures are applicable so long as the pressing portion is deformed in a substantially V shape in plan view, as described below, upon exertion of the press-reaction force of a predetermined value or greater.

Figure 17:
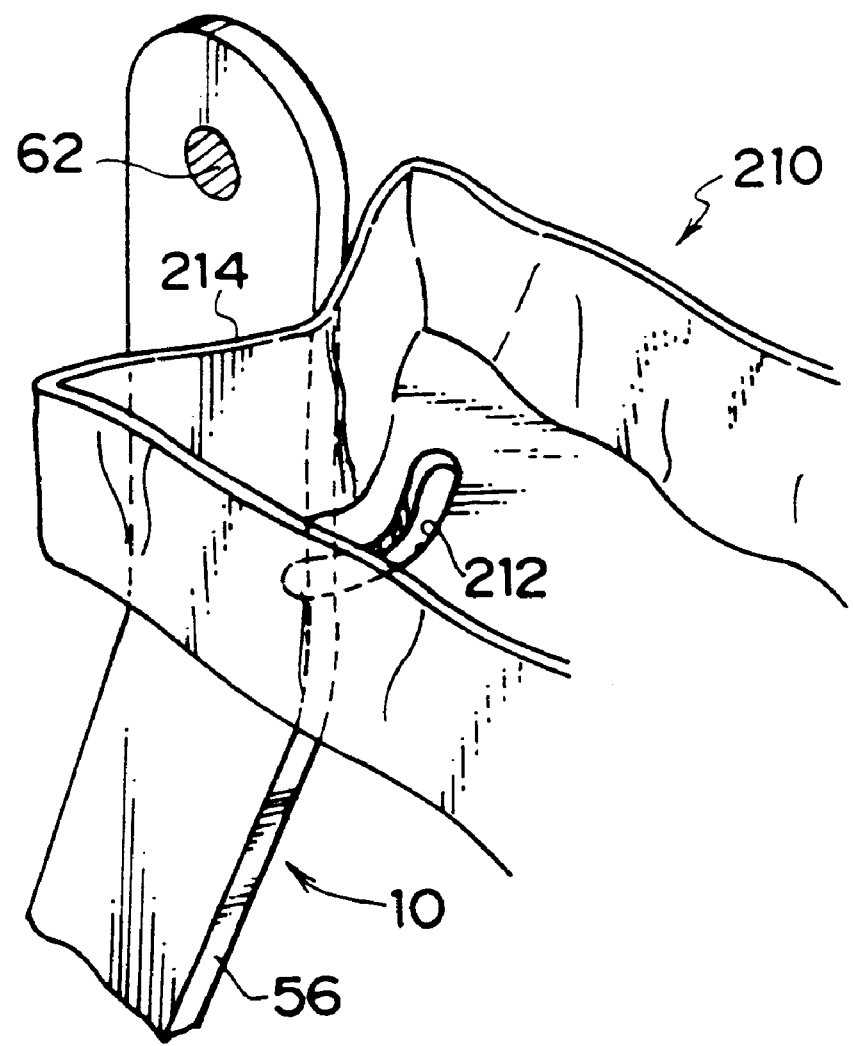
FIG. 17 is a perspective view corresponding to FIG. 16 which shows the state that the pressed portion is deformed from the state shown in FIG. 16 to form the restraining portion.
Figure 19:
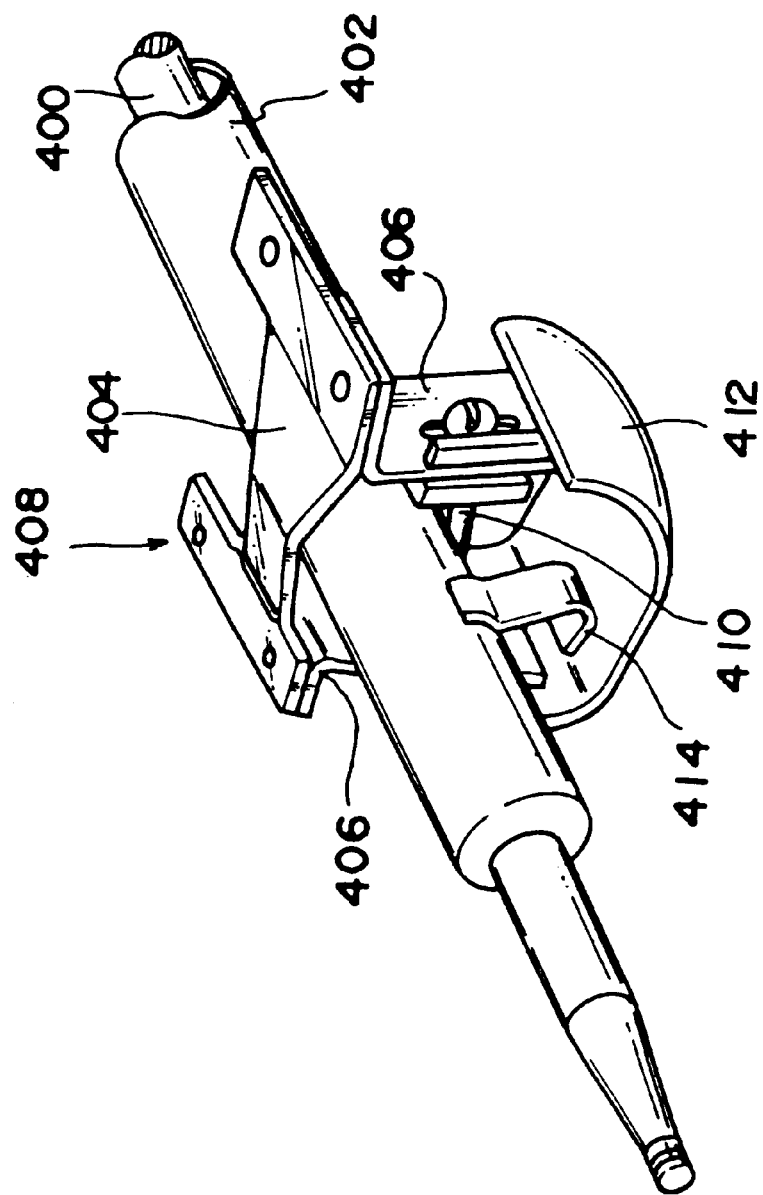
FIG. 19 is a perspective view showing the conventional structure.

According to the above structure, when the pedal support 56 is pressed by the pressing portion 210 toward the front side of the vehicle, and a press-reaction force of a predetermined value or greater is input to the pressing portion 210 from the pedal support 56, the tip portion of the pressing portion 210 is deformed to a substantially V shape in plan view, as shown in FIG. 17, since the rigidity on the tip side of the bottom plate portion of the pressing portion 210 is reduced by forming the elongated hole 212. In other word, the tip portion of the pressing portion 210 is deformed, hence the restraining portion 214 in a substantially V shape in plan view is formed.

In addition, when the pedal support 56 is slightly shifted from the middle portion in the longitudinal direction of the elongated hole 212 to the transverse direction of the vehicle and abuts against the tip portion of the pressing portion 210, the abutting portion is first concaved. However, the closer to the middle portion in the longitudinal direction of the elongated hole 212, the lower is the rigidity. Hence, as a result, the pedal support 56 is drawn to the middle in the width direction of the tip of the pressing portion 210.

As described above, also in this embodiment, even if the brake pedal 10 is shifted in the transverse direction of the vehicle and displaced rearward, as in the sixth embodiment described above, the pedal support 56 is guided to the normal pressing position (that is, the middle position in the longitudinal direction of the elongated hole 212) by the restraining portion 214 formed by deformation of the pressing portion 210. As a result, the pedal support 56 can be pressed securely by the restraining portion 214, and the brake pedal 10 can be securely displaced toward the front of the vehicle about the rotation shaft 60.

Furthermore, in this embodiment, when the press-reaction force applied from the pedal support 56 to the tip portion of the pressing portion 210 is relatively large, the deformed magnitude of said tip portion becomes large and a sharp restraining portion 214 is formed. Therefore, as in the sixth embodiment, the pedal support 56 is held by a sharp restraining portion 214, and even if load in various directions is applied to said pedal support 56, the pedal support 56 is not disengaged from the restraining portion 214. That is, with this structure, the restraint in the transverse direction of the vehicle with respect to the pedal support 56 is also increased.

In addition, according to this embodiment, the tip portion of the pressing portion 210 deforms to form the restraining portion 214, and during the deformation process, the press-reaction force from the pedal support 56 can be absorbed. That is, according to this embodiment, the energy-absorbing effect can be obtained by the deformation of the tip portion of the pressing portion 210. Therefore, the load transmitted from the pressing portion 210 to the inner panel reinforcement 74 can be reduced. As a result, according to this embodiment, it can be prevented that the press-reaction force affects the inner panel reinforcement 74.

In this embodiment, as in the sixth embodiment described above, since a stress is put on the point that the shifting of the brake pedal 10 in the transverse direction of the vehicle with respect to the pressing portion 200 is restrained, the structure in which only the elongated hole 212 is provided on a tip portion of the pressing portion 210 is adopted. As shown in FIG. 15, however, the structure adopted in the fifth embodiment (a structure in which a restraining block 182 is provided on the pedal support 56) may be added. Thus, both the operation and effect of the fifth embodiment and the operation and effect of the seventh embodiment can be obtained simultaneously.

Furthermore, in this embodiment, the restraining portion 214 is formed by deforming the pressing portion 210, however, it is not limited to this structure. And such a structure may be adopted that the relative displacement in the vertical direction of the vehicle or the relative displacement in the transverse direction of the vehicle at a position where the brake pedal 10 is pressed by the pressing portion 210 (abutting position) is restrained by deforming the brake pedal 10.

Furthermore, in respective embodiments described above, the present invention is applied to a suspension-type main brake pedal, but the present invention is not limited thereto, and applicable to a suspension-type clutch pedal and the like.

What is claimed is:

1. A pedal displacement-control structure for a vehicle, comprising:

a pedal bracket fixed to a first member constituting one portion of a vehicle body, said first member being displaced to rearward of the vehicle when an external force of a predetermined external force value or greater is applied to a front portion of the vehicle;

a suspension-type vehicle pedal having a rotation shaft which forms a center of pivot is supported by said pedal bracket;

displacement control means for controlling displacement of a tread of said vehicle pedal by applying a pressing force to said vehicle pedal toward the front of the vehicle at a position between the rotation shaft and the tread of the vehicle pedal when said vehicle pedal is displaced to rearward of the vehicle in accordance with displacement of the first member to rearward of the vehicle, said displacement control means being provided on a second member constituting another portion of the vehicle body, said second member having high rigidity and being arranged more rearward of the vehicle than said vehicle pedal; and means for restricting a press-reaction force of a predetermined press-reaction force value or greater from being transmitted to the second member via the displacement control means, when the pressing force is pressed to said vehicle pedal from said displacement control means.

2. A pedal displacement-control structure for a vehicle according to claim 1, wherein said restricting means comprises energy-absorbing means for absorbing the press-reaction force from said vehicle pedal said energy-absorbing means being provided on said displacement control means.

3. A pedal displacement-control structure for a vehicle according to claim 2, wherein said energy-absorbing means is a fragile portion.

4. A pedal displacement-control structure for a vehicle according to claim 2, wherein said energy-absorbing means is a low-rigidity portion which is deformed by the press-reaction force of the predetermined press-reaction force value or greater via said displacement control means, when the pressing force is applied to said vehicle pedal from said displacement control means.

5. A pedal displacement-control structure for a vehicle according to claim 2, wherein said energy-absorbing means is a buckling portion which is buckled by the press-reaction force of the predetermined value press-reaction force or greater via said displacement control means, when the pressing force is applied to said vehicle pedal from said displacement control means.

6. A pedal displacement-control structure for a vehicle according to claim 2, wherein said energy-absorbing means is an elastically deformable portion which is elastically deformed by the press-reaction force of the predetermined press-reaction force value or greater via said displacement control means, when the pressing force is applied to said vehicle pedal from said displacement control means.

7. A pedal displacement-control structure for a vehicle, comprising:

a pedal bracket fixed to a first member constituting one portion of a vehicle body which is displaced to rearward of the vehicle when an external force of a predetermined external force value or greater is applied to a front portion of the vehicle;

a suspension-type vehicle pedal whose rotation shaft which forms a center of pivot is supported by said pedal bracket;

displacement control means for controlling displacement of a tread of said vehicle pedal by applying a pressing force frontward of the vehicle to said vehicle pedal at a position between the rotation shaft and the tread of the vehicle pedal when said vehicle pedal is displaced to rearward of the vehicle in accordance with displacement of the first member to rearward of the vehicle, said displacement control means being provided on a second member constituting another portion of the vehicle body, said second member having high rigidity and being arranged more rearward of the vehicle than said vehicle pedal, and restraining means for restraining relative displacement of the displacement control means and the vehicle pedal when the pressing force is applied to the vehicle pedal from the displacement control means, said restraining means being provided on one of the displacement control means and the vehicle pedal.

8. A pedal displacement-control structure for a vehicle according to claim 7, wherein said restraining means is a deformable portion which is deformed when said displacement control means receives a press-reaction force from said vehicle pedal.

9. A pedal displacement-control structure for a vehicle according to claim 7, wherein said restraining means is a restraining block which is provided on said vehicle pedal and abuts against said displacement control means to restrain the relative displacement between said displacement control means and said vehicle pedal, when the pressing force is applied to said vehicle pedal from said displacement control means.

10. A pedal displacement-control structure for a vehicle according to claim 7, wherein said restraining means comprises a deformable portion which is provided on said displacement control means and deformed when said displacement control means receives a press-reaction force from said vehicle pedal, and a restraining block which is provided on said vehicle pedal and abuts against said displacement control means to restrain the relative displacement between said displacement control means and said vehicle pedal, when the pressing force is applied to said vehicle pedal from said displacement control means.

11. A pedal displacement-control structure for a vehicle according to claim 7, wherein said restraining means comprises a V-shaped concave portion against which said vehicle pedal abuts to be guided when the pressing force is applied to said vehicle pedal from the displacement control means.

12. A pedal displacement-control structure for a vehicle according to claim 7, wherein said restraining means is a deformable portion which is deformed in a substantial V shape if said displacement control means receives a press-reaction force from said vehicle pedal, when the pressing force is applied to said vehicle pedal from said displacement control means.

13. A pedal displacement-control structure for a vehicle according to claim 12, wherein said deformable portion is a low-rigidity portion.

14. A pedal displacement-control structure for a vehicle, comprising:

a pedal bracket fixed to a first member constituting one portion of a vehicle body, said first member being displaced to rearward of the vehicle when an external force of a predetermined external force value or greater is applied to a front portion of the vehicle;

a suspension-type vehicle pedal having a rotation shaft which forms a center of pivot is supported by said pedal bracket;

displacement control means for controlling displacement of a tread of said vehicle pedal by applying a pressing force to said vehicle pedal toward the front of the vehicle about the rotation shaft when said vehicle pedal is displaced to rearward of the vehicle in accordance with displacement of the first member to rearward of the vehicle, said displacement control means being provided on a second member constituting another portion of the vehicle body, said second member having high rigidity and being arranged more rearward of the vehicle than said vehicle pedal; and means for restricting a press-reaction force of a predetermined press-reaction force value or greater from being transmitted to the second member via the displacement control means, when the pressing force is pressed to said vehicle pedal from said displacement control means, wherein said vehicle pedal is kept via a coupling portion in a coupled state with means for transmitting a stepping force applied to the tread of said vehicle pedal to a braking device, and said restricting means comprises means for canceling the coupled state.

15. A pedal displacement-control structure for a vehicle according to claim 14, wherein said canceling means comprises a pressing portion which is provided on said displacement control means, and when the pressing force is applied to said vehicle pedal, pressing the coupling portion against the press-reaction force of the predetermined press-reaction force value or greater to cancel said coupled state.

16. A pedal displacement-control structure for a vehicle according to claim 15, wherein said pressing portion cancels the coupled state by pressing said coupling portion in a predetermined direction.

17. A pedal displacement-control structure for a vehicle according to claim 16, wherein said pressing portion includes an inclined plane inclining at a predetermined angle with respect to a longitudinal direction of the vehicle, and said coupling portion is pressed in said predetermined direction by said inclined plane.

18. A pedal displacement-control structure for a vehicle according to claim 16, wherein said pressing portion comprises a restraining portion for restraining the direction of the relative movement between said coupling portion and said pressing portion, when the pressing force is applied to said vehicle pedal.

* * * * *